United States Patent
Imai

(10) Patent No.: US 11,100,615 B2
(45) Date of Patent: Aug. 24, 2021

(54) IMAGE PROCESSING DEVICE, IMAGE PROCESSING METHOD, AND IMAGE PROCESSING PROGRAM

(71) Applicant: CASIO COMPUTER CO., LTD., Tokyo (JP)

(72) Inventor: Shintaro Imai, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 145 days.

(21) Appl. No.: 16/435,377

(22) Filed: Jun. 7, 2019

(65) Prior Publication Data
US 2019/0385284 A1    Dec. 19, 2019

(30) Foreign Application Priority Data

Jun. 15, 2018  (JP) .............................. JP2018-114952
Oct. 12, 2018  (JP) .............................. JP2018-193195

(51) Int. Cl.
*G06K 9/00* (2006.01)
*H04N 5/228* (2006.01)
(Continued)

(52) U.S. Cl.
CPC .......... *G06T 5/006* (2013.01); *G06K 9/00281* (2013.01); *G06T 5/50* (2013.01);
(Continued)

(58) Field of Classification Search
USPC ........ 382/100, 103, 106–107, 117–118, 162, 382/168, 173, 181, 209, 219, 232, 254,
(Continued)

(56) References Cited

U.S. PATENT DOCUMENTS 7,869,630 B2 * 1/2011 Matsuhira ............ G06K 9/3208
                                                        382/118
9,652,661 B2   5/2017 Tang et al.
(Continued)

FOREIGN PATENT DOCUMENTS

CN     103632165 A     3/2014
CN     105701763 A     6/2016
(Continued)

OTHER PUBLICATIONS

Chinese Office Action (and English translation thereof) dated Nov. 5, 2020, issued in counterpart Chinese Application No. 201910515934.1.
(Continued)

*Primary Examiner* — Seyed H Azarian
(74) *Attorney, Agent, or Firm* — Holtz, Holtz & Volek PC

(57) ABSTRACT

A correction process is realized by a simpler method. An imaging apparatus 1 includes an image acquisition unit 51, a template storage unit 62, an adaptive position specifying unit 53, and a distortion correction processing unit 55. The image acquisition unit 51 acquires an image including a predetermined subject. The template storage unit 62 stores a template including correction degrees of respective positions in a shape corresponding to a correction target region of the predetermined subject, the correction degrees being different at the respective positions. The adaptive position specifying unit 53 specifies coordinates adapting to a template in the image. The distortion correction processing unit 55 corrects the image on the basis of coordinates specified by the adaptive position specifying unit 53 and the correction degree included in the template.

17 Claims, 16 Drawing Sheets

(51) Int. Cl.
*G06T 5/00* (2006.01)
*G06T 5/50* (2006.01)
(52) U.S. Cl.
CPC ............... *G06T 2207/20104* (2013.01); *G06T 2207/20172* (2013.01); *G06T 2207/30201* (2013.01)
(58) Field of Classification Search
USPC ............... 382/276, 286, 291, 305, 312, 275; 348/208.1
See application file for complete search history.

(56) References Cited

U.S. PATENT DOCUMENTS

| | | | | |
|---|---|---|---|---|
| 2014/0010416 A1* | 1/2014 | Tanaka | ............... | G06K 9/00221 382/118 |
| 2015/0003681 A1* | 1/2015 | Kunieda | ............ | G06K 9/00288 382/103 |
| 2015/0138380 A1* | 5/2015 | Tsubaki | ............. | H04N 5/23248 348/208.1 |
| 2019/0156549 A1* | 5/2019 | Bouaziz | ................... | G06T 7/292 |
| 2019/0318151 A1* | 10/2019 | Shichijo | ............. | G06K 9/00845 |

FOREIGN PATENT DOCUMENTS

| | | |
|---|---|---|
| CN | 107742274 A | 2/2018 |
| JP | 2012142772 A | 7/2012 |
| JP | 2013109787 A | 6/2013 |
| JP | 2015011555 A | 1/2015 |

OTHER PUBLICATIONS

Chinese Office Action (and English translation thereof) dated Jul. 1, 2021, issued in counterpart Chinese Application No. 201910515934.1.

* cited by examiner

FIG. 5
(A) DETECT FEATURE POINT
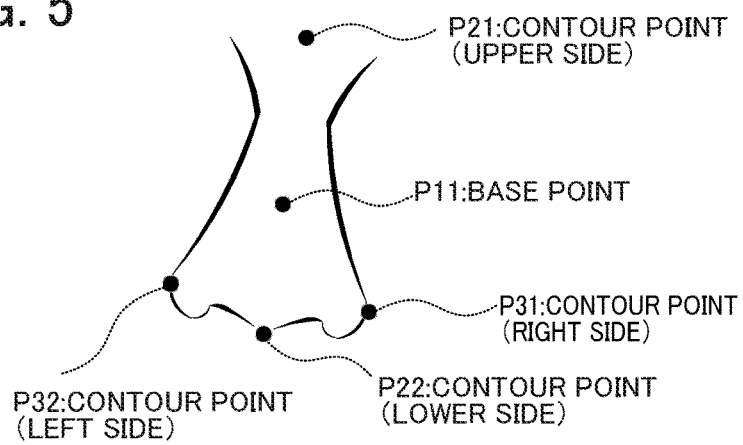
(B) ALIGNMENT OF TEMPLATE BASED ON BASE POINT
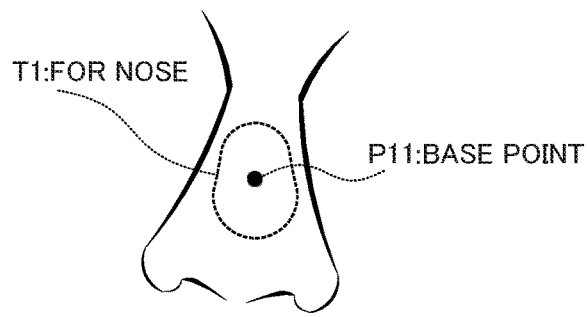
(C) ROTATE TEMPLATE ON BASIS OF ANGLE
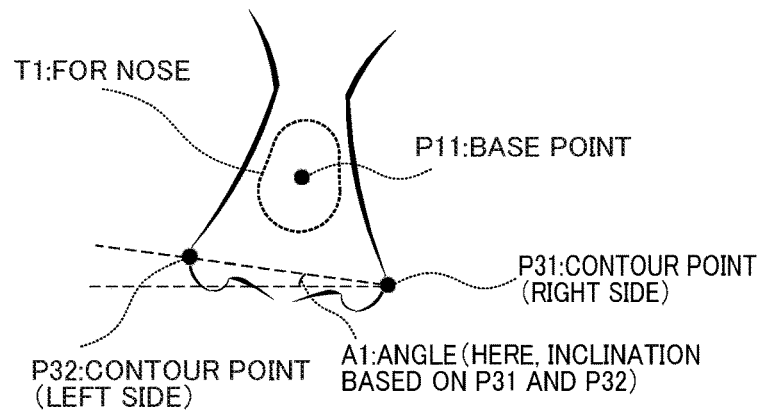
(D) ENLARGE TEMPLATE ON BASIS OF POSITION OF CONTOUR POINT (OR REDUCE)
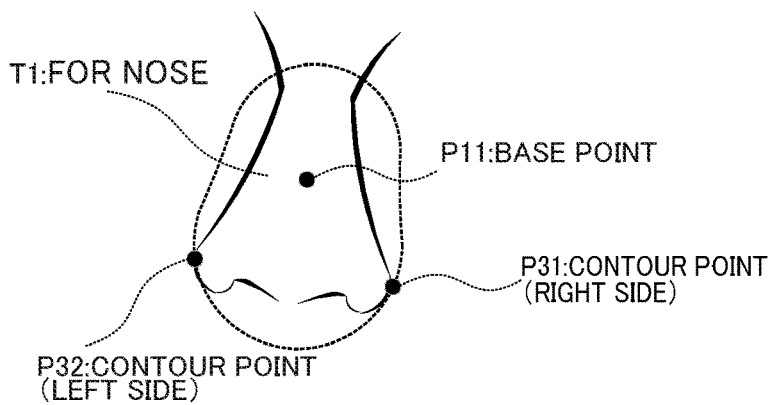

<ORIGINAL IMAGE BEFORE CORRECTION>

<CORRECTED IMAGE OF RELATED ART>

<CORRECTED IMAGE BY PRESENT EMBODIMENT>

CORRECT NOSE AND FACE LINE PROPERLY WITH ALPHA MAP

FIG. 12
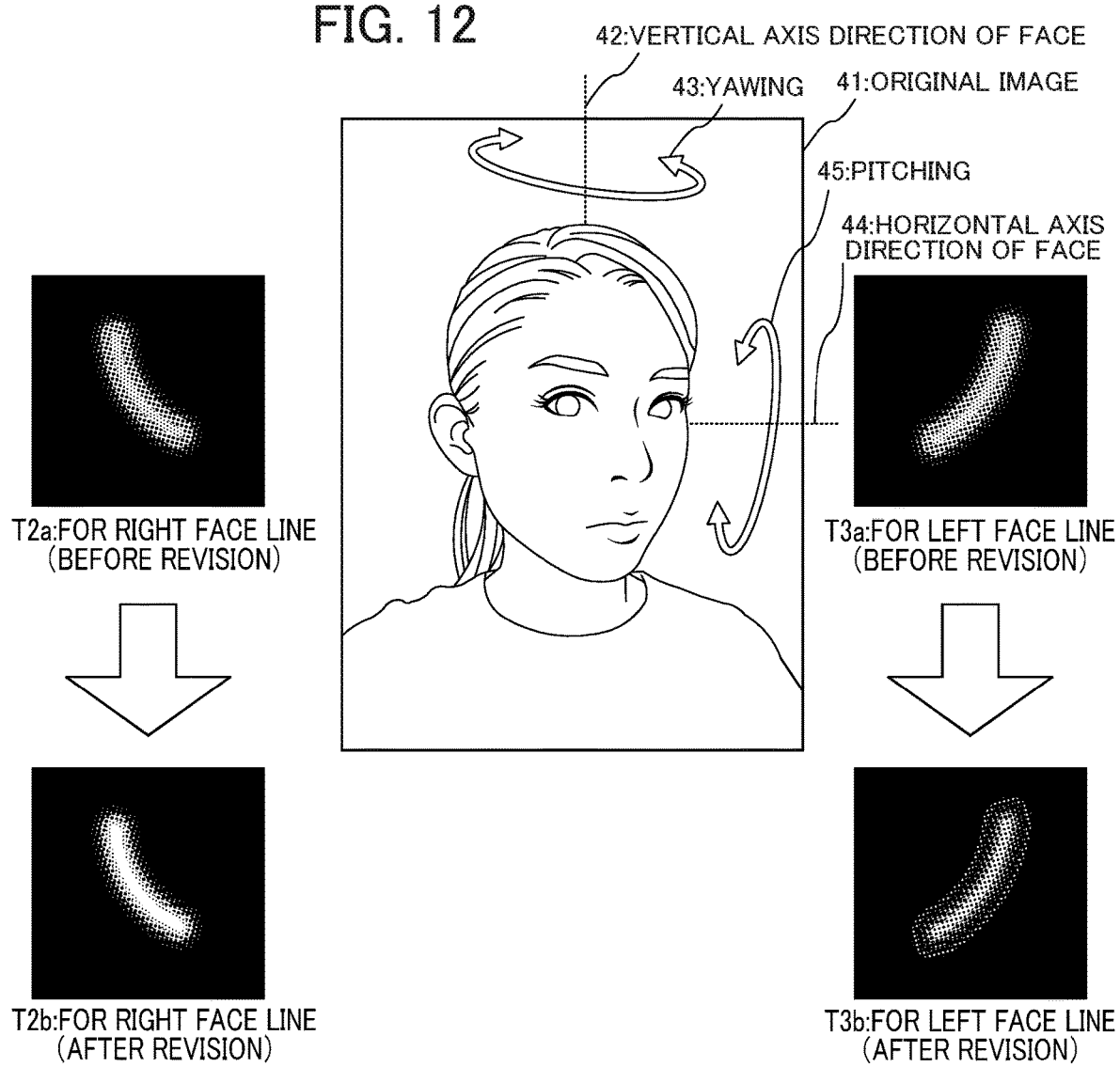
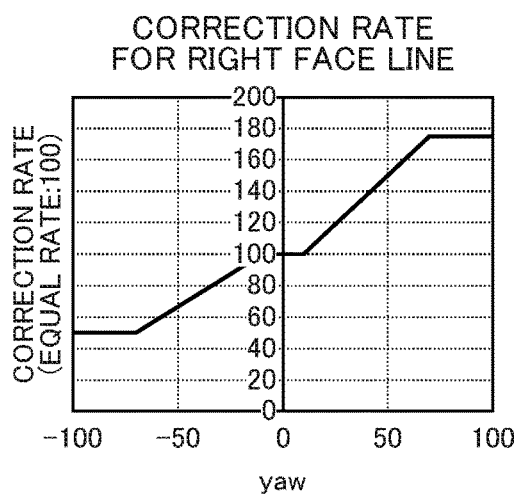
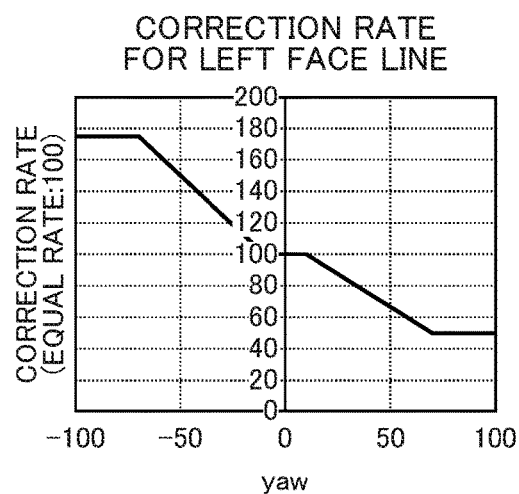

FIG. 13
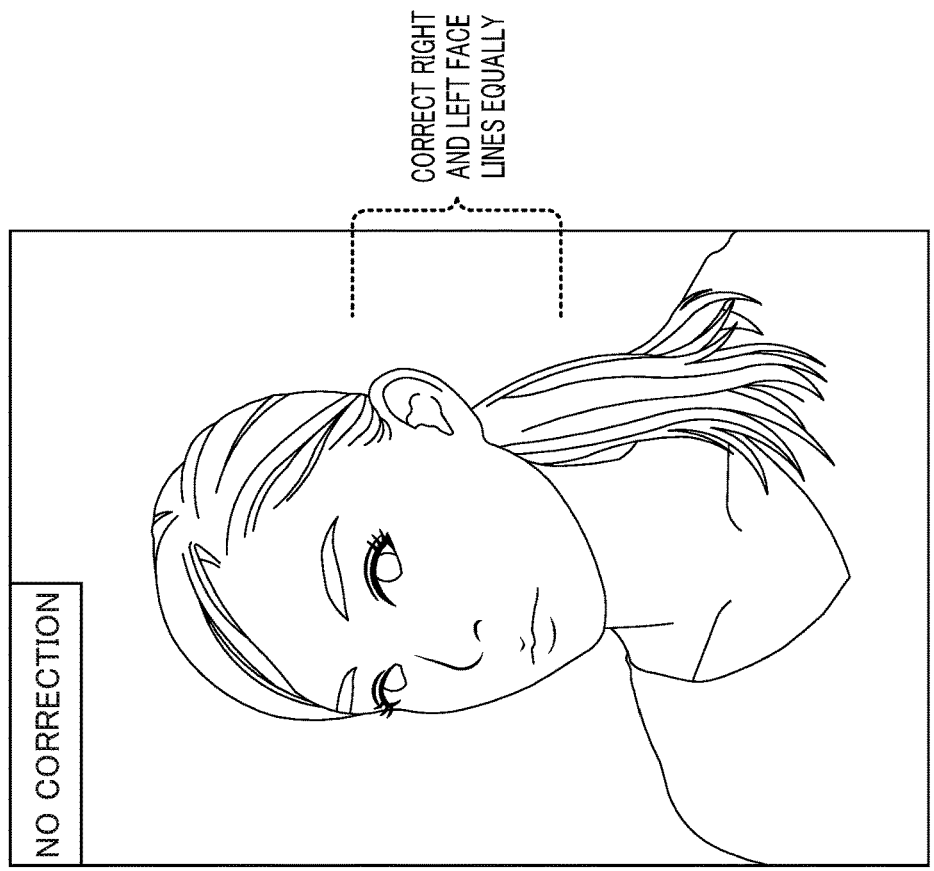

FIG. 14

FIG. 15

IMAGE PROCESSING DEVICE, IMAGE PROCESSING METHOD, AND IMAGE PROCESSING PROGRAM

CROSS-REFERENCE TO RELATED APPLICATIONS

This application is based upon and claims the benefit of priority under 35 USC 119 of Japanese Patent Application No. 2018-114952 filed on Jun. 15, 2018 and Japanese Patent Application No. 2018-193195 filed on Oct. 12, 2018 the entire disclosure of which, including the description, claims, drawings, and abstract, is incorporated herein by reference in its entirety.

BACKGROUND OF THE INVENTION

1. Field of the Invention

The present invention relates to an image processing device, an image processing method, and a recording medium having an image processing program stored therein.

2. Related Art

In the past, a predetermined correction process has been performed on an image of a subject obtained by imaging. Although there are various processes as the predetermined correction process, for example, as disclosed in JP 2012-142772 A, when a face of a user is photographed as a subject, the face of the user can be corrected to be smaller by performing distortion correction on the face part of the user in the image.

BRIEF SUMMARY OF THE INVENTION

One embodiment is an image processing device comprising: a processor, wherein the processor executes to perform operations comprising: acquiring an image including a subject; storing a template corresponding to a correction target region of the subject in the image, a plurality of correction degrees which are different from each other; specifying coordinates corresponding to the correction target region in the image adapting to the template; and performing correction on the correction target region of the image on the basis of coordinates specified by the specifying and the plurality of correction degrees included in the template.

BRIEF DESCRIPTION OF THE SEVERAL VIEWS OF THE DRAWING

FIG. 5 is a schematic diagram for describing adaptation of a template to an original image.

FIG. 12 is a schematic diagram for describing revision of an alpha value by the imaging apparatus.

FIG. 13 is a schematic diagram illustrating an example of an image which has undergone distortion correction after an alpha value is revised in a slim face correction process.

FIG. 14 is a schematic diagram illustrating another example of an image which has undergone distortion correction after an alpha value is revised in a slim face correction process.

FIG. 15 is a schematic diagram illustrating another example of an image which has undergone distortion correction after an alpha value is revised in a slim face correction process.

DETAILED DESCRIPTION OF THE INVENTION

Hereinafter, an embodiment of the present invention will be described with reference to the appended drawings.

Figure 1:
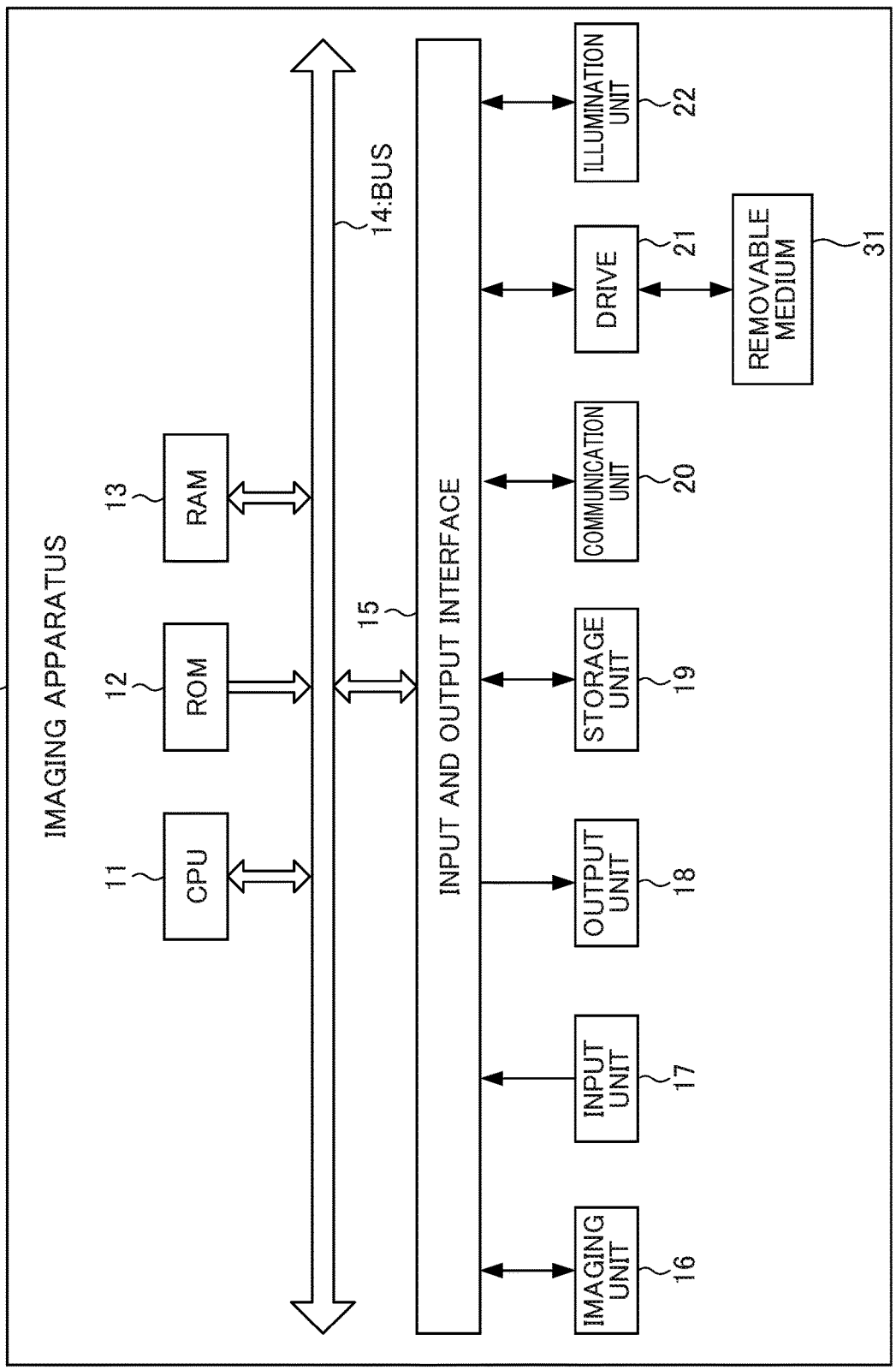
FIG. 1 is a block diagram illustrating a hardware configuration of an imaging apparatus according to an embodiment of an image processing device of the present invention.

FIG. 1 is a block diagram illustrating the hardware configuration of an imaging apparatus 1 according to an embodiment of an image processing apparatus of the invention. The imaging apparatus 1 is configured as, for example, a digital camera.

As shown in FIG. 1, the imaging apparatus 1 includes a CPU (Central Processing Unit) 11 serving as a processor, a ROM (Read Only Memory) 12, a RAM (Random Access Memory) 13, a bus 14, an input and output interface 15, an image capture unit 16, an input unit 17, an output unit 18, a storage unit 19, a communication unit 20, a drive 21, and an illumination unit 22.

The CPU 11 executes various processes according to a program recorded in the ROM 12 or a program loaded from the storage unit 19 into the RAM 13.

The RAM 13 also stores data and the like necessary for the CPU 11 to execute various processes as appropriate.

The CPU 11, the ROM 12, and the RAM 13 are mutually connected via the bus 14. The input and output interface 15 is also connected to the bus 14. The input and output interface 15 is also connected to the image capture unit 16, the input unit 17, the output unit 18, the storage unit 19, the communication unit 20, the drive 21, and the illumination unit 22.

Although not shown, the image capture unit 16 includes an optical lens unit and an image sensor.

The optical lens unit is composed of a lens that collects light, for example, a focus lens, a zoom lens, etc., in order to photograph a subject. The focus lens is a lens that forms a subject image on the light receiving surface of the image sensor. The zoom lens is a lens that freely changes the focal length within a certain range. A peripheral circuit for adjusting setting parameters such as focus, exposure, white balance and the like is provided in the optical lens unit as necessary.

The image sensor is composed of a photoelectric conversion element, an AFE (Analog Front End) and the like. The photoelectric conversion element is composed of, for example, a CMOS (Complementary Metal Oxide Semiconductor) type photoelectric conversion element or the like. A subject image is incident on the photoelectric conversion element from the optical lens unit. Therefore, the photoelectric conversion element photoelectrically converts (capture) the subject image, accumulates an image signal for a certain period of time, and sequentially supplies the accumulated image signal to the AFE as an analog signal. The AFE executes various signal processing such as A/D (Analog/Digital) conversion processing and the like on the analog image signal. A digital signal is generated by various kinds of signal processing and output as an output signal of the image capture unit 16. Such an output signal of the image capture unit 16 is hereinafter referred to as "captured image data". Data of the captured image is appropriately supplied to the CPU 11, an image processing unit (not shown), and the like.

The input unit 17 is composed of various buttons and the like, and inputs various information according to an instruction operation by a user. The output unit 18 includes a display, a speaker, and the like, and outputs images and sounds. The storage unit 19 is made of a DRAM (Dynamic Random Access Memory) and the like, and stores data of various images. The communication unit 20 controls communication with other apparatuses (not illustrated) through a network including the Internet.

A removable medium 31 formed of a magnetic disk, an optical disk, a magnetooptical disk, a semiconductor memory, or the like, is suitably mounted on a drive 21. A program read out from the removable medium 31 by the drive 21, is installed in a storage unit 19, as necessary. In addition, the removable medium 31 is also capable of recording various data items such as data of an image recorded in the storage unit 109, as with the storage unit 109.

The illumination unit 22 includes eight LEDs (light emitting members) that are provided around the imaging unit 16 in a circular shape and one LED that is provided at a position separated from the eight LEDs in the imaging apparatus 1. These LEDs selectively emit light according to an operation of the user in a case in which a live view image is captured or in a case in which an image is recorded. As such, the arrival direction of beams for illumination is changed and the image of the face is captured. Therefore, it is possible to acquire a face image whose shade has been artificially controlled.

The imaging apparatus 1 having the above configuration has a function to correct a subject naturally without giving discomfort by performing distortion correction using a template on an image obtained by photographing the subject. Accordingly, for example, when the face of the user is the subject, the face of the user can become a natural slim face without giving discomfort. Hereinafter, a series of processes for distortion correction using the template by the imaging apparatus 1 is referred to as a "slim face correction process".

Next, an overview of the slim face correction process will be described with reference to FIG. 2.

[Overview of Slim Face Correction Process]

Figure 2:
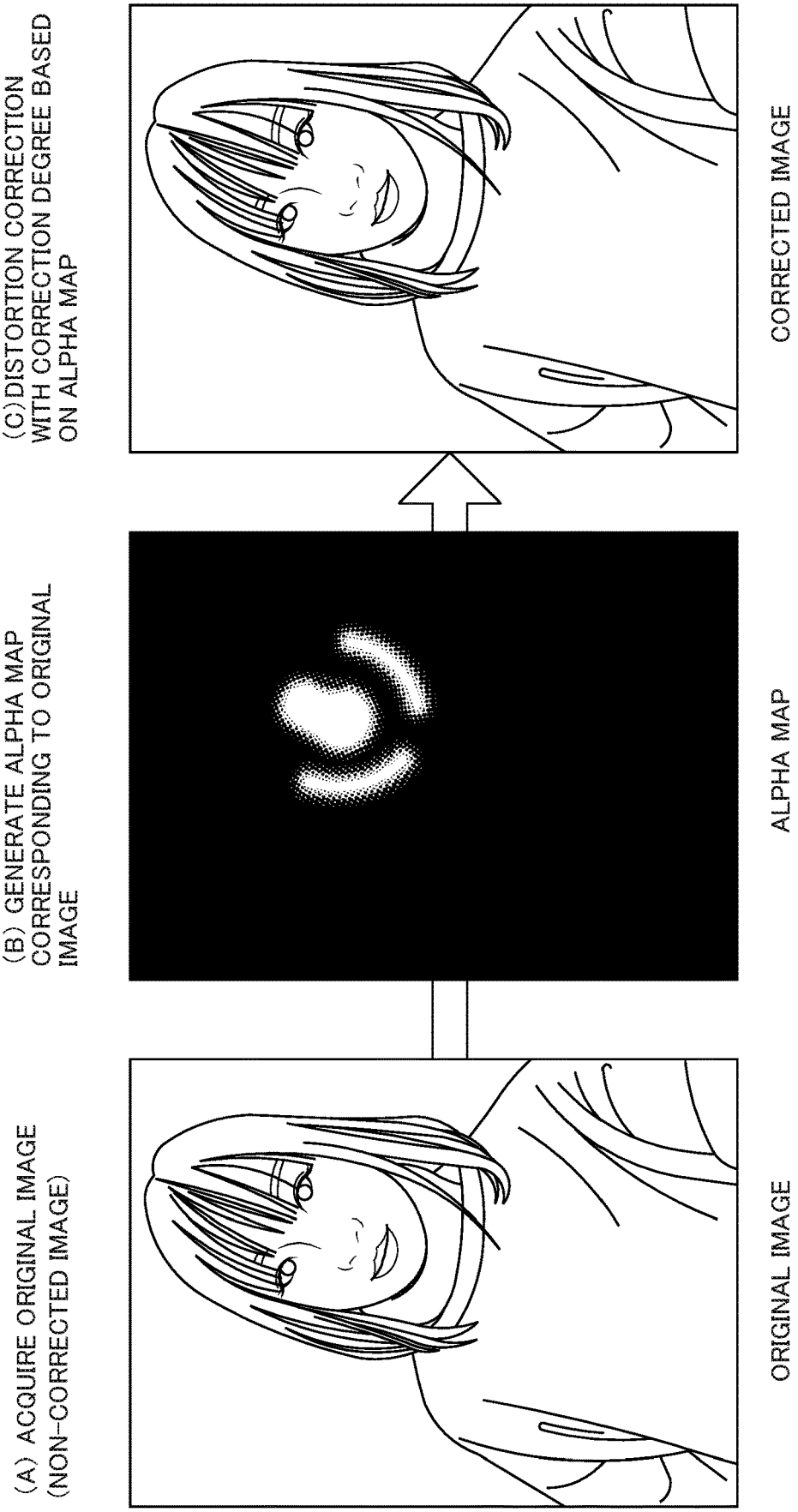
FIG. 2 is a schematic diagram for describing an overview of a slim face correction process by the imaging apparatus of FIG. 1.

FIG. 2 is a schematic diagram for describing an overview of the slim face correction process by the imaging apparatus 1. FIG. 2 illustrates an example in which local distortion correction is performed on a region including a nose muscle that is a predetermined organ included in the face and each of right and left face line regions which are predetermined part.

As illustrated in (A) in FIG. 2, the imaging apparatus 1 acquires a non-corrected image (hereinafter referred to as an "original image") as a target of the slim face correction process. Also, the imaging apparatus 1 specifies a region serving as a target of the distortion correction in the original image (hereinafter referred to as a "correction target region"). For that purpose, the imaging apparatus 1 stores a template in which predetermined organ likeness and predetermined part likeness of the face are defined in a shape in accordance with each of a predetermined organ or part. Also, the imaging apparatus 1 causes the template to adapt to a position of a corresponding predetermined organ or predetermined part of the original image. Here, this template includes a value (hereinafter referred to as an "alpha value") indicating a correction degree of each position in the shape corresponding to the face correction target region included in the original image.

Further, as illustrated in (B) in FIG. 2, the imaging apparatus 1 generates a map indicating the correction degree of each position in the original image (hereinafter, an "alpha map") by arranging each template in a background in which the alpha value is "0" at all coordinates in the original image (hereinafter referred to as a "black background") on the basis of an adaptation result.

Further, as illustrated in (C) in FIG. 2, the imaging apparatus 1 performs the distortion correction on the original image. In this case, the imaging apparatus 1 performs the distortion correction with a degree based on a correction degree at each of the coordinates included in the alpha map. Specifically, in the distortion correction, the correction is realized by moving each coordinates of the original image in a predetermined direction. For example, in a case in which the face of the user is a slim face, the correction is realized by moving each coordinates in the correction target region in the center direction of the face. The imaging apparatus 1 performs the distortion correction by deciding an amount of movement of each coordinates in accordance with the degree based on the correction degree at each coordinates included in the alpha map.

According to the imaging apparatus 1, the distortion correction can be performed only on the correction target region corresponding to the template without performing unnecessary correction on regions other than the correction target region. Further, the distortion correction according to a uniform correction degree is not performed, and the distortion correction can be performed appropriately on each organ or predetermined part corresponding to the alpha value included in the template.

Also, although the imaging apparatus 1 uses a template of a shape indicating certain organ likeness and predetermined part likeness which is the correction target region, the correction degree is set so that the portion around the contour in the contour of the template has a smaller correction degree than the central portion of the template. In other words, in this template, a different correction degree is set in the correction target region of the subject in the image. Therefore, even when a contour of a predetermined organ or a contour of a predetermined part serving as the correction target region does not completely adapt to the contour of the template, the influence on the region around the contour is small, and it is possible to naturally correct the subject as a whole without discomfort. Therefore, according to the imaging apparatus 1, it is possible to eliminate the need to detect the contour of an organ or a predetermined part with a high degree of accuracy. Further, the distortion correction can be performed without lowering the quality of the corrected image substantially even when the contour of an organ or a predetermined part is not detected with a high degree of accuracy. Regarding this point, according to the related art, in order to perform appropriate distortion correction, it is necessary to specify a position of an organ or a predetermined part of the user which is to be corrected and the entire contour of an organ or a predetermined part with a high degree of accuracy. On the other hand, as described above, the imaging apparatus 1 can perform the distortion correction without lowering the quality of the corrected image substantially after eliminating the need to detect the contour of an organ or a predetermined part with a high degree of accuracy. In other words, according to the present embodiment, the correction process can be realized by a simpler method.

[Functional Blocks]

Figure 3:
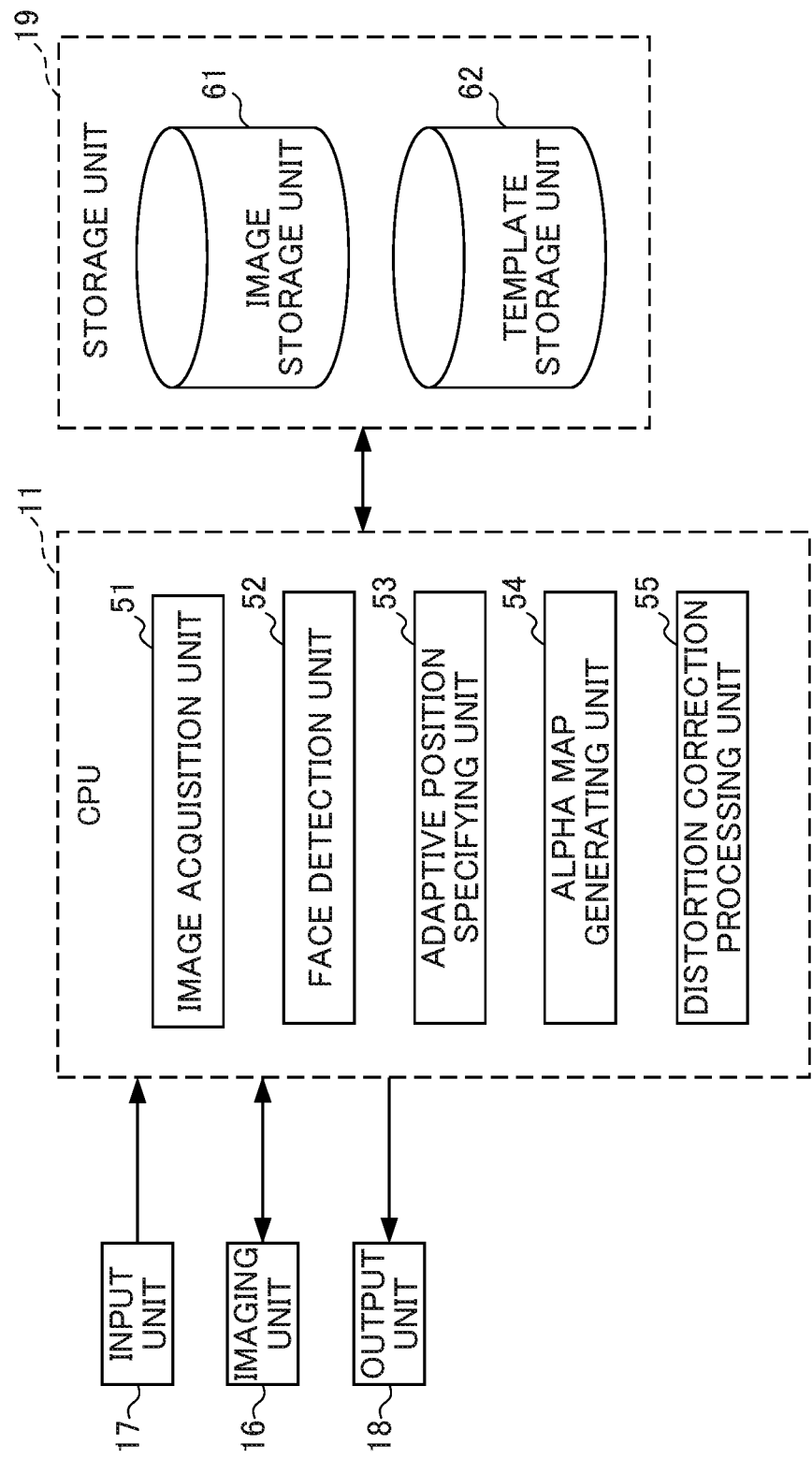
FIG. 3 is a functional block diagram illustrating a functional configuration for executing the slim face correction process in the functional configuration of the imaging apparatus of FIG. 1.

FIG. 3 is a functional block diagram illustrating a functional configuration for executing a slim face correction process among the functional configurations of the imaging apparatus 1 of FIG. 1. As described above, the slim face correction process is a series of processes for performing the distortion correction using the template.

When the slim face correction process is executed, an image acquisition unit 51, a face detection unit 52, an adaptive position specifying unit 53, an alpha map generating unit 54, and a distortion correction processing unit 55 function in the CPU 11 as illustrated in FIG. 3.

In other words, the CPU 11 executes processes of the image acquisition unit 51, the face detection unit 52, the adaptive position specifying unit 53, the alpha map generating unit 54, and the distortion correction processing unit 55.

Also, an image storage unit 61 and a template storage unit 62 are installed in a region of the storage unit 19.

The image storage unit 61 stores data of a captured image which is obtained by performing the development process on an image captured by the imaging unit 16 and output from the imaging unit 16. The template storage unit 62 stores data of templates of shapes corresponding to various types of parts of the face. The template will be described in detail with reference to FIG. 4.

The image acquisition unit 51 acquires data of a captured image which is obtained by performing the development process on an image captured by the imaging unit 16 or data of an image serving as a processing target from the image storage unit 61.

The face detection unit 52 detects the face from the original image. Further, the face detection unit 52 detects feature points of a predetermined organ and a predetermined part corresponding to the correction target region. The process by the face detection unit 52 will be described in detail later with reference to FIG. 5.

The adaptive position specifying unit 53 specifies coordinates in the original image adapting to the template. The process by the adaptive position specifying unit 53 will be described in detail later with reference to FIG. 5.

The alpha map generating unit 54 generates the alpha map on the basis of the coordinates adapting to the template. The process by the alpha map generating unit 54 will be described in detail later with reference to FIG. 6.

The distortion correction processing unit 55 performs the distortion correction on the basis of the alpha value included in the alpha map. The process by the distortion correction processing unit 55 will be described in detail later after description of the alpha map generating unit 54 with reference to FIG. 6.

[Specific Example of Template]

Figure 4:
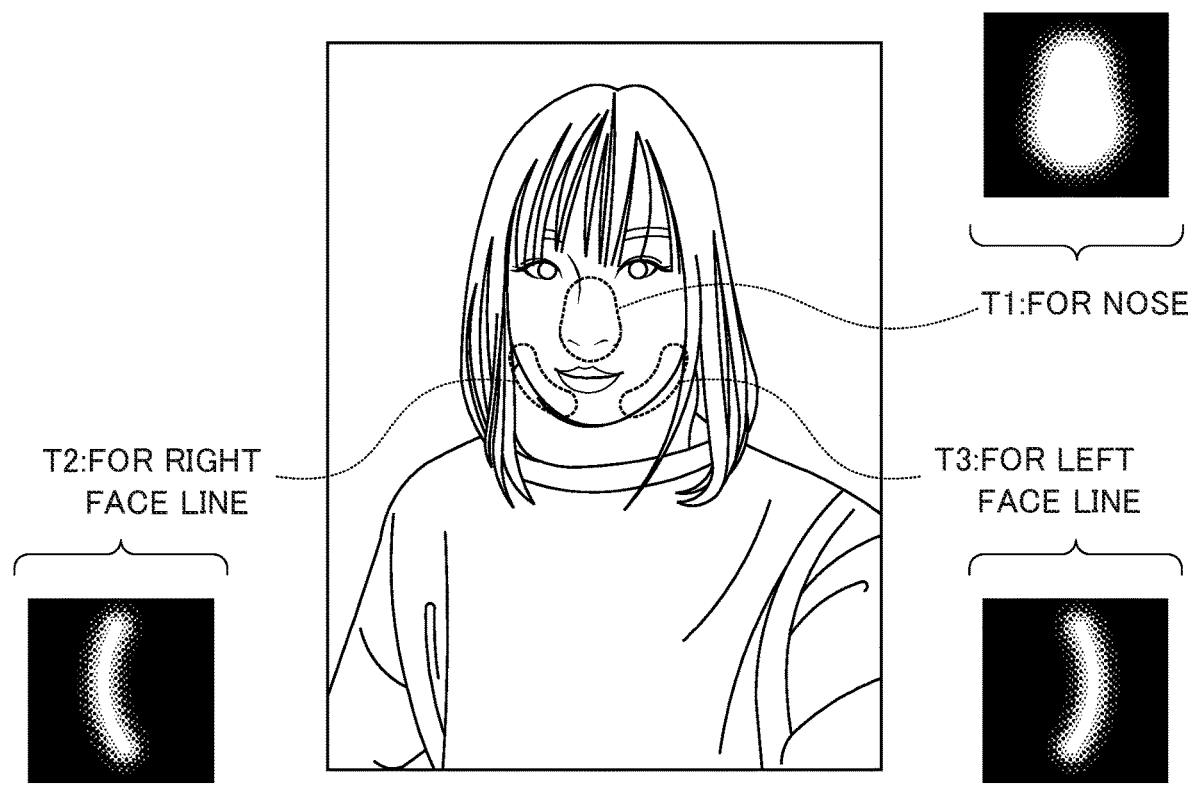
FIG. 4 is a schematic diagram illustrating a relation between a shape of a template and an example of an alpha value and a part of a face to which a template is applied.

Next, the template stored by the template storage unit 62 will be described in detail with reference to FIG. 4. FIG. 4 is a schematic diagram illustrating a relation between a shape of template and an example of the alpha value and the part of the face to which template is applied. Here, the template is a template that simulates a shape of a correction target region corresponding to a predetermined organ or a predetermined part of the face in a general face and indicates specific part-likeness of the face. Also, as described above, the template includes the alpha value indicating a correction degree of each position in the shape corresponding to the correction target region.

FIG. 4 illustrates an example in which a "nose template T1" which is a template corresponding to a nose, a "right face line template T2" which is a template corresponding to a right face line, and a "left face line template T3" which is a template corresponding to a left face line are applied together. In FIG. 4 and FIG. 5 to be described later, the template is indicated by a closed region of a dashed line. Also, in these drawings, a value of "0" as an expression of the alpha value of the template is indicated by black, a value of "1" is indicated by white, and an intermediate value from "0" to "1" is indicated by hatching.

As illustrated in FIG. 4, the nose template T1 is used to reduce the entire nose by setting the entire nose the correction target region. Further, in the nose template T1, the alpha value is set to "1" so that the central part of the nose is reduced more, the alpha value is set "0" so that the region other than the contour of the nose is not reduced, and the alpha value is set to the "intermediate value from 0 to 1" so that its reduction of the part around the contour in the contour of the nose is suppressed further than the central part. The nose is reduced more naturally by performing the distortion correction on the basis of the alpha values set so that the correction degree changes stepwise as it gets closer to the center of the nose, so that the effect of the slim face is obtained.

Also, as illustrated in FIG. 4, the right face line template T2 and the left face line template T3 are used to reduce the face lines of the right and left cheeks (especially, jaw parts) by setting the right and left face lines as the correction target regions. The right face line template T2 and the left face line template T3 are bilaterally symmetrical with respect to the center line of the face so that the right and left cheeks are reduced equally.

Also, in the right face line template T2 and the left face line template T3, the alpha value is set to "1" so that the region of the central part of the face line is reduced more, the alpha value is set to "0" so that the region other than the contour of the face line is not reduced, and the alpha value is set to the "intermediate value from 0 to 1" is set so that the area around the contour in the contour of the face line is reduced further than the central part. The right and left face lines are reduced more naturally by performing the distortion correction on the basis of the alpha values set so that the correction degree changes stepwise as it gets closer to the center of the face line, so that the effect of the slim face is obtained.

As described above, the template corresponds to the correction target region of the subject in the image, and a plurality of different correction degrees are set in the template. Also, the template is set in a shape corresponding to the correction target region of the subject in the image, and a plurality of correction degrees set in the shape are set to be different. Further, the template includes the correction degrees of respective positions in the shape corresponding to the correction target region of the subject in the image, that is, different correction degrees at respective positions.

Note that only one template may be stored for regions with a symmetrical shape in order to reduce the amount of data, and when used, symmetric conversion may be performed, and a converted template may be used. For example, a template corresponding to the left face line may be stored, and symmetric conversion may be performed by performing left-right inversion when used, and a converted template may be used as a template corresponding to the right face line.

[Adaptation of Template]

Next, the adaptation of the template with the original image performed by the face detection unit 52 and the adaptive position specifying unit 53 will be described. FIG. 5 is a schematic diagram for describing the adaptation of the template with the original image. In FIG. 5, a case in which the nose template T1 is adapted to the nose in the original image acquired by the image acquisition unit 51 will be described as an example.

When the adaptation of the template is performed, the face detection unit 52 detects feature points in the original image as illustrated in (A) in FIG. 5. Specifically, the face detection unit 52 detects a point serving as a base point and a contour point as the feature points. The point serving as the base point is, for example, a point corresponding to the center of the nose such as a base point P11 in (A) in FIG. 5. Also, the points serving as the contour point are, for example, points corresponding to both upper and lower ends of the nose such as a contour point P21 and a contour point P22 in (A) in FIG. 5 and points corresponding to both right and left ends of nose such as a contour point P31 and a contour point P32 in (A) in FIG. 5. A process related to the adaptation to be described with reference to (B) in FIG. 5 and subsequent drawings is performed on the basis of coordinates of each feature points detected as described above in the original image. The existing face detection technique and feature point detection technique can be used for face detection and detection of the feature points by the face detection unit 52.

Then, as illustrated in (B) in FIG. 5, the adaptive position specifying unit 53 aligns the template on the basis of the base point. Specifically, the adaptive position specifying unit 53 aligns the template by aligning the coordinates of the center of the nose template T1 with the coordinates of the center of base point P11.

Then, as illustrated in (C) in FIG. 5, the adaptive position specifying unit 53 rotates the template on the basis of an angle. Here, as illustrated in (C) in FIG. 5, for example, an angle A1 which is an angle formed by a straight line connecting the contour point P31 and the contour point P32 and a straight line parallel to the X-axis can be used. Since the angle A1 is an angle indicating an inclination of the nose, the adaptive position specifying unit 53 can cause the angle of the template to adapt to by rotating the nose template T1 by the same angle as the angle A1 using the base point P11 as the rotation center.

Finally, as illustrated in (D) in FIG. 5, the adaptive position specifying unit 53 enlarges or reduces the template on the basis of the position of the contour point. In other words, the size of the template is adapted to. Specifically, the adaptive position specifying unit 53 enlarges or reduces the nose template T1 while the shape of the nose template T1 so that both ends of the nose template T1 have the same size as the nose ends indicated by the contour point P31 and the contour point P32. In this case, the adaptive position specifying unit 53 maintains the alpha value included in the nose template T1 without changing it.

As described above with reference to (A) to (D) in FIG. 5, the template can be adapted to the original image. This adaptation can be realized by detecting only the base point and a plurality of contour points as described above. In other words, it is not necessary to specify the entire contour of the organ or part which is the correction target with a high degree of accuracy. In other words, according to the present embodiment, the correction process can be realized by a simpler method.

Also, when there are a plurality of templates, coordinates adapting to a plurality of templates are specified independently for each of a plurality of templates. Therefore, even when the face is close to or tilted sideways in the original image, and the angle and the size of the face line are not symmetrical, it is possible to adjust the angle or the size of the template so that they adapt to the right and left face lines. In other words, according to the present embodiment, it is possible to cause a common template prepared in advance to adapt to each of various original images having different face directions or sizes.

In the above description, the adaptation is performed using the base point P11, the contour point P31, and the contour point P32, but the present invention is not limited thereto, and the adaptation can be performed using other contour points. This point will be described later as a first modified example.

[Generation of Alpha Map]

Figure 6:
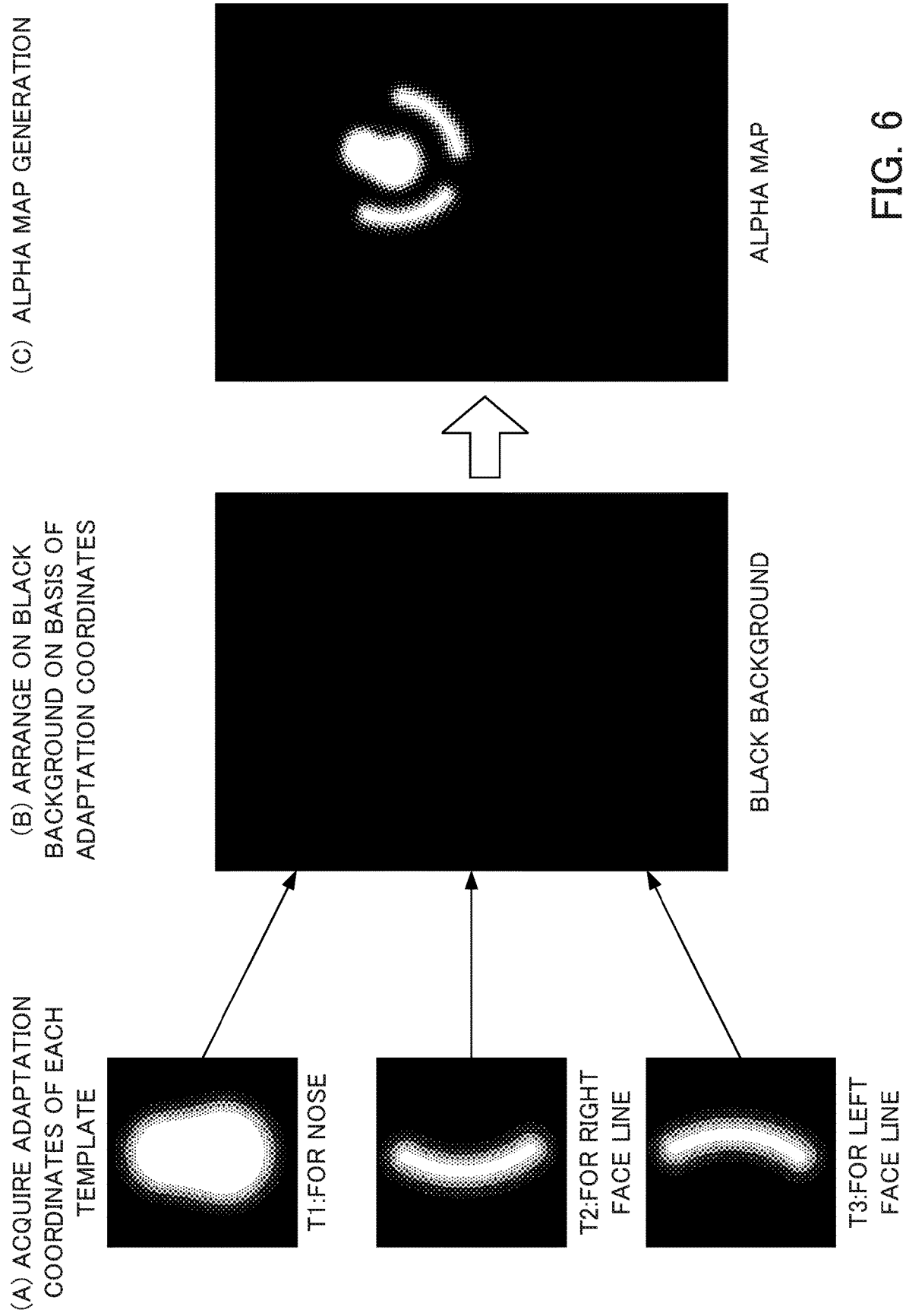
FIG. 6 is a schematic diagram for describing generation of an alpha map using a plurality of templates.

Next, generation of the alpha map performed by the alpha map generating unit 54 will be described. FIG. 6 is a schematic diagram for describing the generation of the alpha map using a plurality of templates. As illustrated in (A) in FIG. 6, the alpha map generating unit 54 acquires coordinates adapting to each of a plurality of templates specified by the adaptive position specifying unit 53.

As illustrated in (B) in FIG. 6, the alpha map generating unit 54 arranges each template on coordinates adapting thereto on the black background on the basis of the coordinates adapting to each of a plurality of templates. Note that the black background and the original image are managed using the same coordinate system.

As illustrated in (C) in FIG. 6, the alpha map generating unit 54 generates the alpha map by arranging all the templates on the black background.

[Distortion Correction Based on Alpha Map]

Next, the distortion correction based on the alpha value included in the alpha map which is performed by the distortion correction processing unit 55 will be described. As described above with reference to FIG. 2, in the present embodiment, the distortion correction on the basis of the alpha value included in the alpha map is performed on the original image.

Specifically, the distortion correction processing unit 55 first calculates the coordinates after the distortion correction for all coordinates in the original image when the distortion correction is performed without using the alpha map. For example, the coordinates after the distortion correction of reducing the face using the region of the entire face as the target are calculated for all the coordinates of the original image. Further, the existing distortion correction technique can be used to calculate the coordinates after the distortion correction.

As described above, the coordinates after the distortion correction (hereinafter referred to as "the coordinates before the alpha map is applied") when the distortion correction is performed without using the alpha map are calculated for all the coordinates in the original image.

Then, the distortion correction processing unit 55 corrects the correction degree at each coordinates by applying the alpha map. Specifically, the distortion correction processing unit 55 calculates the coordinates after the distortion correction to which the alpha map is applied (hereinafter, referred to as "alpha map-applied coordinates") for all the coordinates in the original image on the basis of the following <alpha map application formula>.

$$(xout, yout) = (xin, yin) \times (1-\alpha) + (xdist, ydist) \times \alpha, \text{ <Alpha map application formula>}$$

where
(xin, yin): coordinates in the original image
(xout, yout): coordinates after the alpha map is applied
(xdist, ydist): corrected coordinates before the alpha map is applied.
Also, a value of $\alpha$ is assumed to have a value of ($0 \leq \alpha \leq 1$).

Then, the distortion correction processing unit 55 performs the correction on the basis of the coordinates after the calculated alpha map is applied. In other words, each coordinate in the original image is moved to the alpha map-applied coordinates. Further, the distortion correction processing unit 55 performs a complementary or the like which is necessary for the movement using the existing technique.

Accordingly, the distortion correction to which the alpha map is applied is realized. As the alpha map is applied as described above, the distortion correction in which the corrected coordinates before the alpha map is applied is applied is performed on coordinates of white in the alpha map (that is, coordinates with the alpha value of "1"). Further, the distortion correction in which the corrected coordinates before the alpha map is applied is applied in accordance with the alpha value is performed on coordinates of the intermediate color in the alpha map (that is, coordinates with the alpha value of "$0<\alpha<1$"). Further, for coordinates of black in the alpha map (that is, coordinates with the alpha value of "0"), the coordinates before the alpha map is applied is not applied, and the coordinates in the original image is used without change. In other words, the local distortion correction corresponding to the correction degree in a plurality of templates described above is performed. The effects of the distortion correction will be described with reference to FIGS. 7, 8, and 9.

Figure 7:
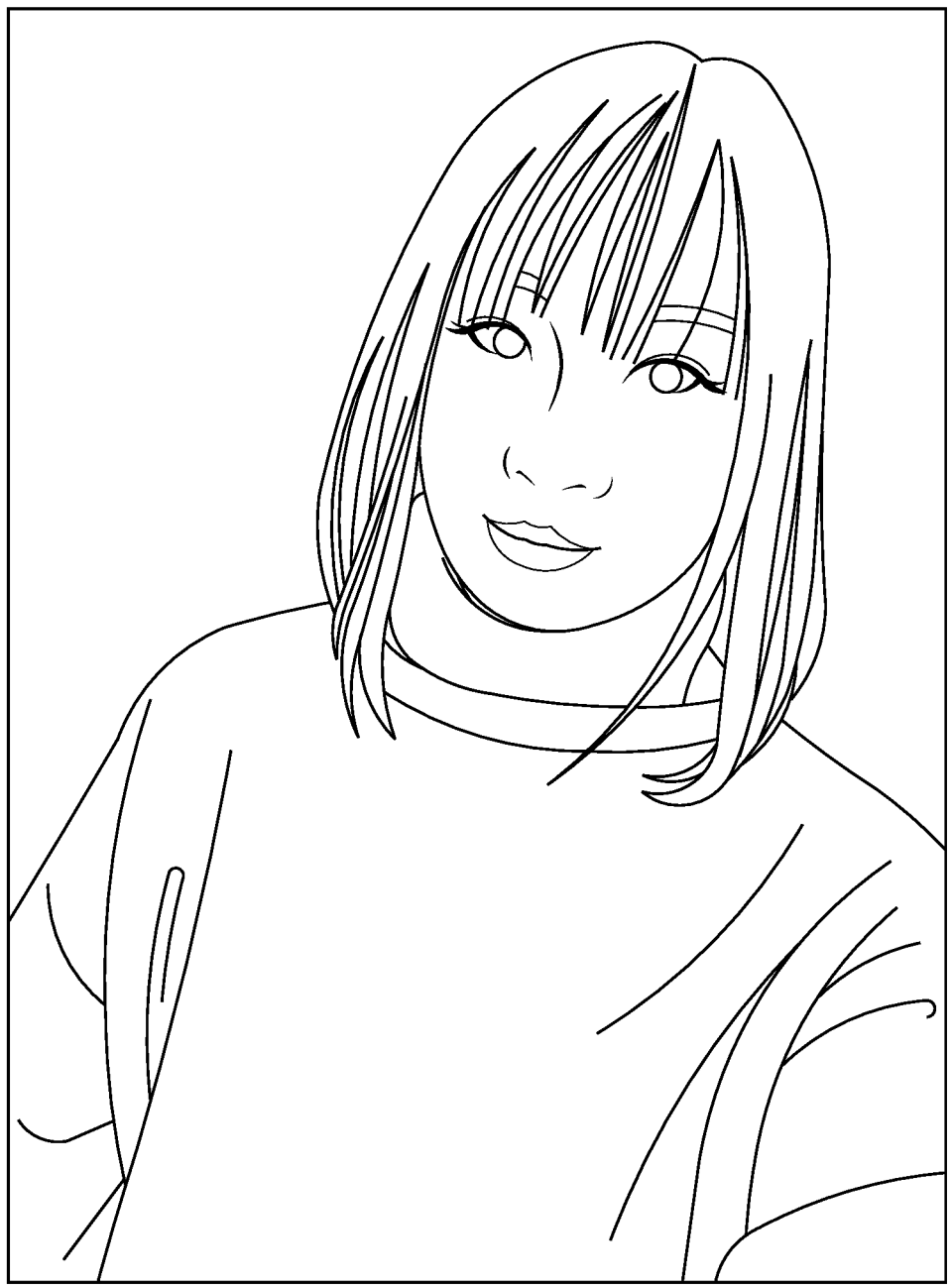
FIG. 7 is a schematic diagram illustrating an example of an original image before correction is performed.
Figure 8:
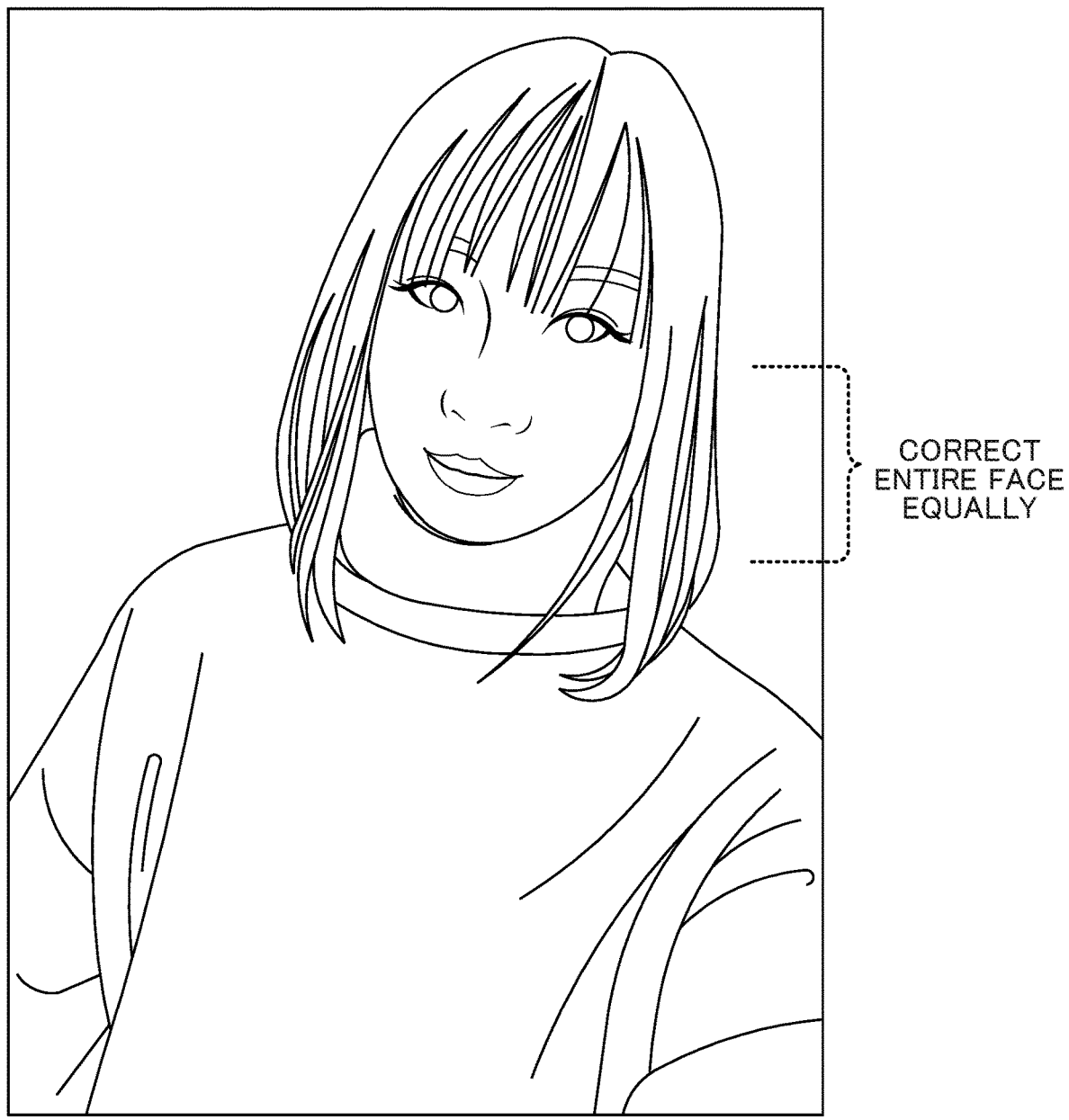
FIG. 8 is a schematic diagram illustrating an example of an image obtained by correcting an original image illustrated in FIG. 7 according to a related art.
Figure 9:
FIG. 9 is a schematic diagram illustrating an example of an image obtained by correcting the original image illustrated in FIG. 7 by a slim face correction process by the imaging apparatus illustrated in FIG. 1.

FIG. 7 illustrates an example of the original image before the distortion correction is performed. Further, FIG. 8 illustrates an example of an image obtained by correcting the original image illustrated in FIG. 7 in accordance with the related art (that is, the distortion correction not using the alpha map). Further, FIG. 9 illustrates an example of an image obtained by correcting the original image illustrated in FIG. 7 by the distortion correction using the alpha map in the present embodiment described above.

If the original image of FIG. 7 is compared with the image corrected by the related art of FIG. 8, in the related, the alpha map is not used, but the distortion correction is performed using the entire face as the correction target region, so that the entire face is equally corrected. In this case, since the entire face is reduced, the head tends to be large relatively.

Further, it is difficult to make the chin thinner because the entire chin is equally reduced. Therefore, in the related art, the user may feel discomfort in the corrected image and may feel unnatural.

On the other hand, in the present embodiment, the local distortion correction corresponding to the correction degree in a plurality of templates described above is performed. Therefore, if the original image in FIG. 7 is compared with the image corrected by the present embodiment in FIG. 9, only the correction target region corresponding to the template other than the entire face is reduced, so that the head is prevented from being relatively large. Further, since only the correction target regions corresponding to the right and left face lines other than the entire chin are reduced, so that the chin can be made thinner. Therefore, according to the present embodiment, the face of the user can be made slim and natural without discomfort.

[Operation]

Figure 10:
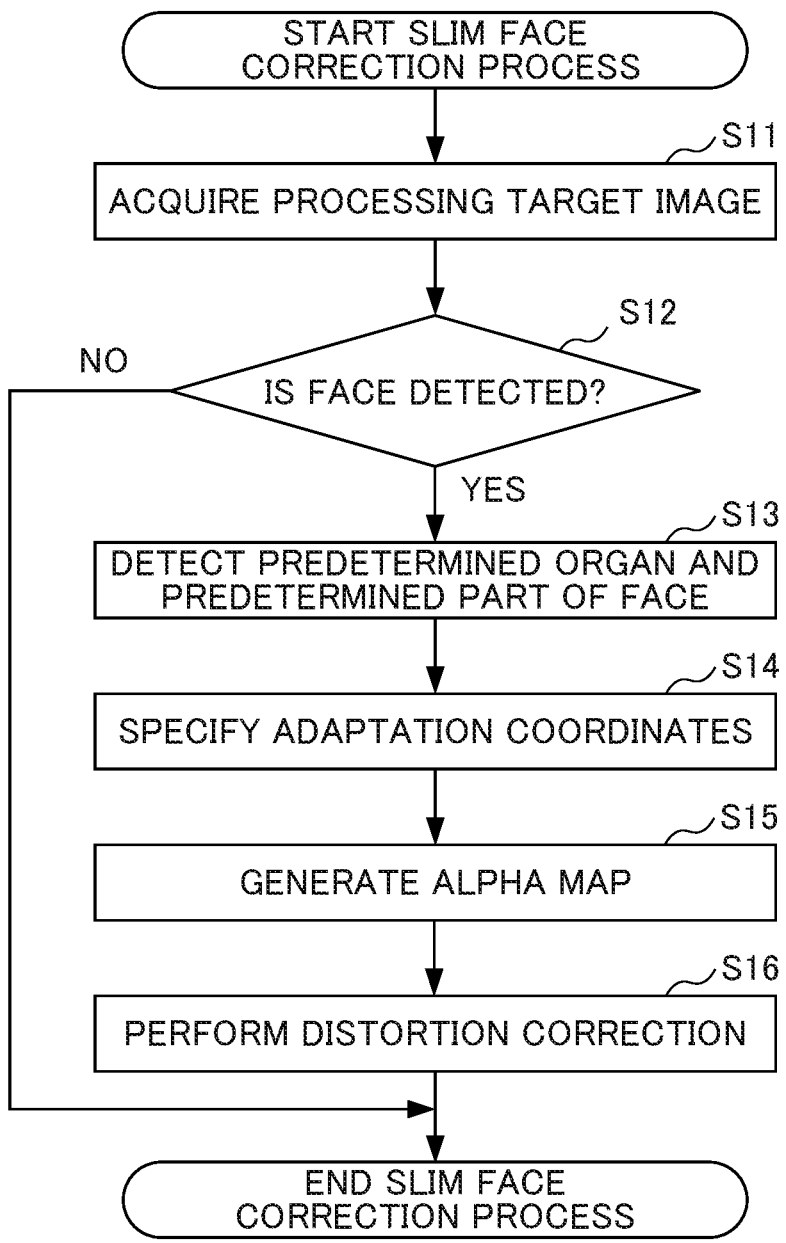
FIG. 10 is a flowchart illustrating the flow of a slim face correction process executed by the imaging apparatus of FIG. 1 having the functional configuration of FIG. 3.

FIG. 10 is a flowchart illustrating the flow of the slim face correction process executed by the imaging apparatus 1 of FIG. 1 having the functional configuration of FIG. 3. The slim face correction process is started when the user performs an operation to start the slim face correction process to the input unit 17. The operation to start the slim face correction process can be used as a photographing instruction operation, the development process is performed on the image captured by the imaging unit 16 in accordance with the photographing instruction operation, and then the slim face correction process can be performed. Alternatively, it is possible to select data of the captured image stored in the image storage unit 61 and perform the operation of start of the slim face correction process on the selected data of the captured image.

In step S11, the image acquisition unit 51 acquires data of the captured image obtained by performing the development process on the image captured by the imaging unit 16 or an image to be processed from the image storage unit 61.

In step S12, the face detection unit 52 performs the face detection on the image to be processed and determines whether or not the face is detected. When the face is not detected, NO is determined in step S12, and the slim face correction process ends. If the face is detected, YES is determined in step S12, and the process proceeds to step S13.

In step S13, the face detection unit 52 detects a predetermined organ and a predetermined part of the face corresponding to the template.

In step S14, the adaptive position specifying unit 53 specifies coordinates in the original image adapting to the template.

In step S15, the alpha map generating unit 54 generates the alpha map on the basis of the coordinates adapting to the template.

In step S16, the distortion correction processing unit 55 performs the distortion correction to which the alpha map is applied. Thereafter, the slim face correction process ends. With the above-described operation, the image in which the face of the user is made slim and natural without discomfort as described above with reference to FIG. 9 is generated.

The imaging apparatus 1 having the above configuration has the image acquisition unit 51, the template storage unit 62, the adaptive position specifying unit 53, and the distortion correction processing unit 55. The image acquisition unit 51 acquires an image in which a predetermined subject is shown. The template storage unit 62 stores a template including the correction degree of each position in the shape corresponding to the correction target region of a predetermined subject, that is, the correction degree changing at each position. The adaptive position specifying unit 53 specifies coordinates in the image adapting to the template. The distortion correction processing unit 55 corrects the image on the basis of the coordinates specified by the adaptive position specifying unit 53 and the correction degree included in the template. Accordingly, the correction can be realized by causing the template to adapt to it, so that it is possible to eliminate the need to accurately detect the contour of an organ or a predetermined part. Therefore, the correction process can be realized by a simpler method. Further, even when the contour of an organ or a predetermined part is not detected with a high degree of accuracy, the correction can be performed without substantially lowering the quality of the corrected image. Further, the distortion correction can be performed only on the correction target region corresponding to the template without performing unnecessary correction on the region other than the correction target region. Further, the distortion correction can be performed appropriately on each organ or predetermined part in accordance with the correction degree included in the template instead of the distortion correction based on the uniform correction degree.

The adaptive position specifying unit 53 analyzes the image, detects the coordinates of the first feature point of the predetermined subject and the coordinates of the second feature point of the predetermined subject, specifies the coordinates adapting to the base point in the template on the basis of the detected coordinates of the first feature point, and specifies the coordinates adapting to the contour in the template on the basis of the detected coordinates of the second feature point. As described above, it is possible to specify the coordinates adapting to the template by detecting only the feature points.

The adaptive position specifying unit 53 arranges the base point of the template at the coordinates of the first feature point, rotates the template using the arranged base point of the template as the rotation center, and specifies the coordinates adapting to the template. Accordingly, it is possible to cause a common template to adapt to each of various original images which differ in the direction and the size of the face by only rotation without preparing a plurality of templates corresponding to respective angles.

The adaptive position specifying unit 53 performs enlargement or reduction while maintaining the shape of the contour of the template on the basis of the detected coordinates of the second feature point and the contour of the template. Accordingly, it is possible to cause a common template to adapt to each of various original images which differ in the direction and the size of the face by only enlargement or reduction without preparing a plurality of templates corresponding to respective angles.

The adaptive position specifying unit 53 does not change the correction degree included in the template. As described above, the correction can be performed with the correction degree corresponding to the template regardless of the size of a predetermined subject included in the original image.

The adaptive position specifying unit 53 specifies the state of the subject in the image and corrects the correction degree included in the template on the basis of the specified state of the subject. The distortion correction processing unit 55 corrects the image on the basis of the correction degree corrected by the adaptive position specifying unit 53 and the coordinates specified by the adaptive position specifying unit 53. Accordingly, it is possible to perform the distortion correction on the basis of the more appropriately corrected correction degree on the basis of the state of the subject. For example, the distortion correction can be performed on the basis of the correction degree which is corrected corresponding to each of a case in which the face rotates leftward or rightward around the vertical axis of the face (that is, yawing) or a case in which the face rotates upward or downward around the horizontal axis of the face (that is, pitching). Therefore, for example, the distortion correction in consideration of the balance of the entire face can be performed.

The adaptive position specifying unit 53 specifies a degree of inclination of the subject as the state of the subject on the basis of a difference between a depth of a first region of the subject in the image and a depth of a second region of the subject in the image. Accordingly, it is possible to specify the degree of inclination of the subject on the basis of a clear index, that is, depth information. Therefore, it is possible to correct the correction degree to a degree corresponding to degree of inclination of the subject. For example, it is possible to perform corrections so that the correction degree increases (or decreases) as the inclination increases.

The distortion correction processing unit 55 performs the distortion correction by moving the coordinates in the image with the correction degree corresponding to at least the correction degree included in the template as the correction on the image. Accordingly, it is possible to perform the correction with the natural distortion correction with the correction degree corresponding to the template without discomfort.

The template storage unit 62 stores a plurality of templates corresponding to a plurality of different correction target regions. The adaptive position specifying unit 53 independently specifies the coordinates adapting to a plurality of templates for each of a plurality of templates. Accordingly, it is possible to cause a common template prepared in advance to adapt to various original images that differ in direction and size of the face.

The predetermined subject is the face, and the correction target region is the organ of the face or the part of the face. Accordingly, the face of the subject can be made slim and natural without discomfort.

The correction degree is set in the template so that the portion around the contour in the contour of the template has a smaller correction degree than the central portion of the template. Therefore, even when a contour of a predetermined organ or a contour of a predetermined part serving as the correction target region does not completely adapt to the contour of the template, the influence on the region around the contour is small, and it is possible to naturally correct the subject as a whole without discomfort.

Note that the present invention is not limited to the above-described embodiment, and modifications, improvements, and the like within the scope in which the objects of the present invention can be achieved are included in the present invention. For example, the above-described embodiment can be modified as modified examples to be described below. Also, the modified examples described below may be combined.

First Modified Example

In the example described above with reference to FIG. 5, the adaptive position specifying unit 53 performs the adaptation using the base point P11, the contour point P31, and the contour point P32, but the present invention is not limited thereto, and the adaptation may be performed using other contour points. For example, the adaptation may be performed using the contour point P21 and the contour point P22 instead of the contour point P31 and the contour point P32. In this case, for example, as illustrated in (C) in FIG. 5, when the template is rotated, an angle formed by a straight line connecting the contour point P21 and the contour point P22 and a straight line parallel to the Y axis (hereinafter referred to as an "angle A2") may be used instead of the angle A1. Also, for example, as illustrated in (D) in FIG. 5, when the template is enlarged or reduced, the nose template T1 may be enlarged or reduced while maintaining the shape of the nose template T1 so that both ends of the nose template T1 have the same size as both ends of the nose indicated by the contour point P21 and the contour point P22.

Further, for example, the adaptation may be performed using the contour point P21 and the contour point P22 may be used together with the contour point P31 and the contour point P32. For example, as illustrated in (C) in FIG. 5, when the template is rotated, the template may be rotated on the basis of an average angle of the angle indicated by the angle A1 and the angle indicated by the angle A2. Also, for example, as illustrated in (D) in FIG. 5, when the template is enlarged or reduced, the nose template T1 may be enlarged or reduced while maintaining the shape of the nose template T1 so that a sum of two differences, that is, a difference between the both ends of the nose template T1 and the both ends of the nose indicated by the contour point P21 and the contour point P22 and a difference between both ends of the nose template T1 and both ends of the nose indicated by the contour point P31 and the contour point P32 is minimized.

Further, for example, when a possibility that the nose of the user is inclined is low in the original image and the size of the nose can be roughly estimated, the process of rotating the template as illustrated in (C) in FIG. 5 and the process of enlarging or reducing the template as illustrated in (D) in FIG. 5 may be omitted. In this case, only the base point P11 may be detected, and the need to detect each contour point can be eliminated.

Second Modified Example

In the above-described embodiment, the alpha map corresponding to the entire original image is generated created, and the distortion correction based on the alpha value included in the alpha map is performed on the entire original image. The present invention is not limited to thereto, and a part of the original image may be clipped by trimming, and the distortion correction may be performed on this clipped image. The present modified example will be described with reference to FIG. 11.

Figure 11:
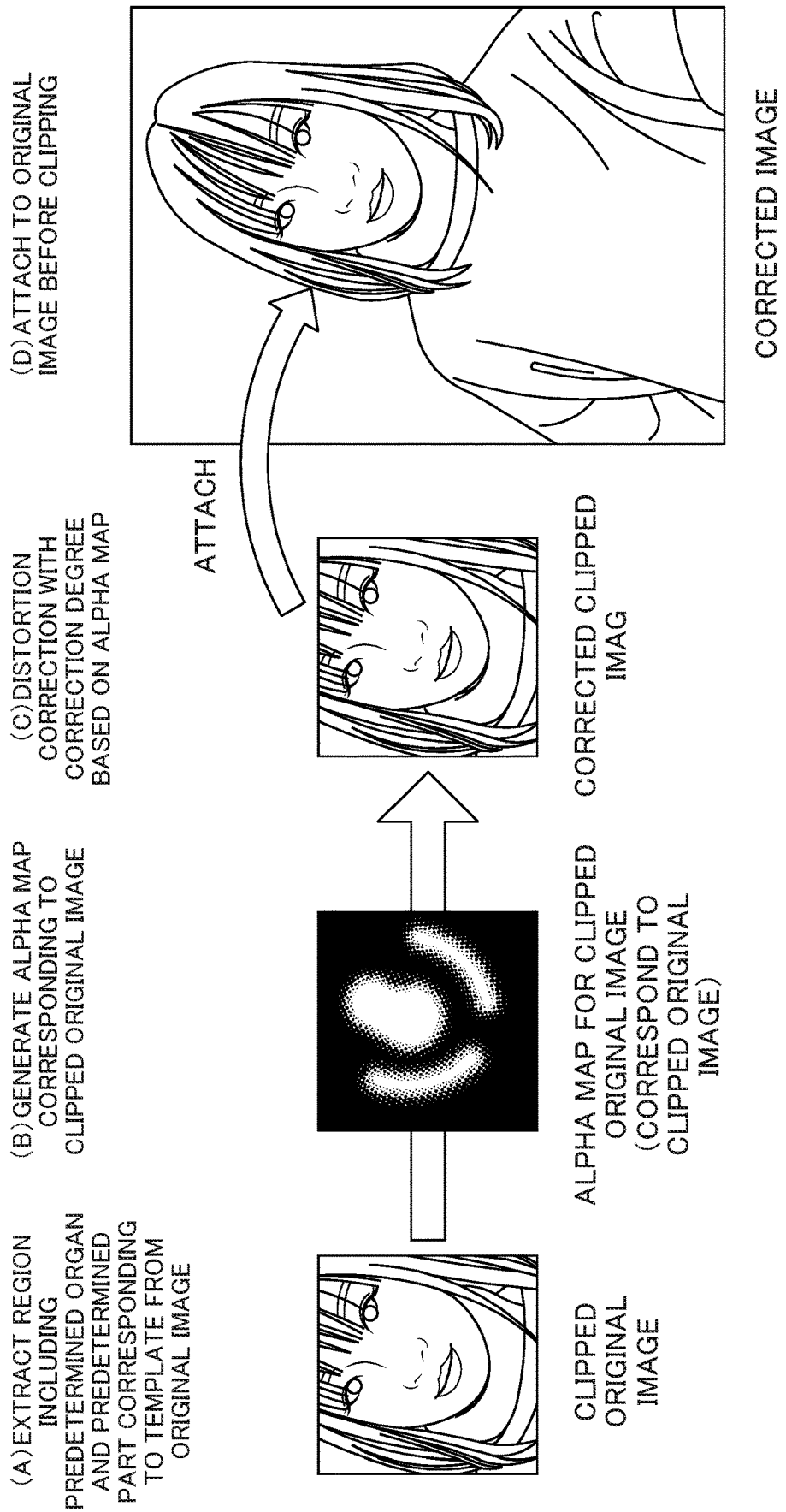
FIG. 11 is a schematic diagram for describing a case in which a trimming process is performed in the slim face correction process by the imaging apparatus of FIG. 1.

First, as illustrated in (A) in FIG. 11, the face detection unit 52 clips a region including a predetermined organ and a predetermined part corresponding to the template from the original image by trimming on the basis of the detection result of the feature point.

Then, as illustrated in (B) in FIG. 11, the alpha map for the clipped original image corresponding to the clipped original image is generated by the adaptation process of the template by the adaptive position specifying unit 53 and the process of generating the alpha map by the alpha map generating unit 54.

Then, as illustrated in (C) in FIG. 11, the distortion correction is performed on the clipped original image by the distortion correction processing unit 55 using the alpha map for the clipped original image. Finally, as illustrated in (D) in FIG. 11, the face detection unit 52 attaches the corrected clipped image to the original image.

The correction similar to that in the above-described embodiment can be performed by the above-described process. For example, it is desirable to apply the present modified example when it is easy to clip a region including a predetermined organ and a predetermined part corresponding to the template from the original image by trimming. As the clipping is performed by the trimming as described above, the number of coordinates serving as candidates to adapt to the template in the adaptation process of the template by the adaptive position specifying unit 53 can be reduced. Therefore, the amount of computation in the adaptation process can be reduced. Further, as the clipping is performed by the trimming as described above, the number of coordinates serving as the alpha map-applied coordinates calculation target by <alpha map application formula> in the distortion correction process by the distortion correction processing unit 55 can be reduced. Therefore, the amount of computation in the adaptation process can be reduced. Therefore, it is possible to reduce the amount of computation of the entire slim face correction process.

Third Modified Example

In the above-described embodiment, the distortion correction using the alpha map is performed on the face of the user. The present invention is not limited thereto, and the distortion correction using the alpha map may be performed on parts other than the face of the user. Also, the distortion correction using the alpha map may be performed on a living being other than the user or a non-living being. In other words, as long as it is possible to prepare a template corresponding to a correction target, the distortion correction using the alpha map may be performed on any correction target.

Further, in the above-described embodiment, the distortion correction using the alpha map reduces a predetermined organ and a predetermined part in an image. The present invention is not limited to thereto, and a predetermined organ or a predetermined part may be enlarged in the image by the distortion correction using the alpha map. For example, a template corresponding to both eyes of the user may be prepared, and both eyes of the user may be enlarged by the distortion correction using the alpha map.

Fourth Modified Example

In the above-described embodiment, in the slim face correction process, the distortion correction is performed on the alpha value which is a value indicating correction degree of each position included in the template after the adaptation of the template is performed on the original image. The present invention is not limited to thereto, and the alpha value included in template may be corrected on the basis of a predetermined condition such as the state of the user, and the distortion correction may be performed on the basis of the corrected alpha value. For example, the alpha value included in the template may be revised on the basis of whether or not the face of the user is inclined or the degree of inclination in the original image, and the distortion correction may be performed on the basis of the revised alpha value. An example in which the revision of the alpha value is performed as described above will be described as a fourth modified example.

<Revision of Alpha Value>

FIG. 12 is a schematic diagram for describing the revision of the alpha value by the imaging apparatus 1 according to a fourth modified example. FIG. 12 illustrates an example in which the local distortion correction is performed on each of the right and left face line regions which are predetermined parts included in the face.

FIG. 12 illustrates an original image 41 as an example of the original image. In this modification, as described above, the alpha value included in the template is revised on the basis of the inclination of the face of the user. In this modification, the inclination of the face of the user is specified on the basis of the depth information indicating the depth in a predetermined region of the face of the user. The depth information is information indicating the distance from the imaging apparatus 1 to the subject (here, the face of the user) at the time of imaging. The depth information can be acquired, for example, by installing a depth sensor capable of detecting the distance to the subject by infrared light in the imaging apparatus 1. Besides, the depth information can be acquired by realizing the imaging apparatus 1 with a stereo camera capable of detecting the distance to the subject on the basis of the principle of triangulation.

Also, in the present modified example, the degree of inclination of the face is specified in each of a case in which the face rotates leftward or rightward around the vertical axis of the face (that is, yawing) or a case in which the face rotates upward or downward around the horizontal axis of the face (that is, pitching).

First, a case in which the face rotates leftward or rightward around the vertical axis of the face (that is, yawing) will be described as an example. In the present modified example, the depth information is acquired along with the detection of the face or the like by image analysis. Then, the degree of inclination in yawing 43 in which the face rotates leftward and rightward around a vertical axis direction 42 illustrated in FIG. 12 (hereinafter referred to as a "yaw direction degree of inclination") is specified on the basis of the depth information. The vertical axis direction 42 and the yawing 43 and a horizontal axis direction 44 and pitching 45 to be described later are not information which is actually displayed together with the original image 41 but information illustrated for the convenience of description.

The specifying of the degree of inclination can be calculated on the basis of the difference in the depth information between two predetermined regions of the face. The predetermined regions are not particularly limited as long as they are regions in which the yaw direction degrees of inclination can be calculated. In the following description, as an example, the yaw direction degree of inclination is calculated using the following <yaw direction degree of inclination calculation formula> on the basis of the depth information (depth value) below the left cheek and the depth information (depth value) below the right cheek.

yaw=d_l−d_r; <Yaw direction degree of inclination calculation formula> where d_l: the depth value below the left cheek
d_r: the depth value below the right cheek
yaw: the degree of inclination in the yaw direction Then, the alpha value of the template corresponding to each of the right and left face line regions is revised on the basis of the degree of inclination in the yaw direction. The purpose of this correction is to make the face of the user balanced when the distortion correction is performed at the latter stage. For example, when it can be specified that the user is facing the left side (that is, the right side from an observer facing the image) on the basis of the degree of inclination in the yaw direction, a distortion correction degree (that is, the alpha value) of the left face line of the user is decreased, and a distortion correction degree of the right face line of the user is increased. Accordingly, the right face line of the user which is the front side in the image undergoes distortion correction more than the left face line, and thus the right face line of the user becomes slimmer. Therefore, the right and left faces of the user are balanced.

In this regard, in the present modified example, the alpha value is revised so that the distortion correction is performed as described above. For this reason, a correspondence relation between the degree of inclination in the yaw direction and a correction rate is set in advance for each template. For example, this setting may be stored in the form of a table indicating the correspondence relation or may be stored as a predetermined relational expression. Then, when the degree of inclination in the yaw direction is calculated, it is possible to specify a corresponding correction rate with reference to this table or by performing a calculation using a relational expression.

An example of the correspondence relation between the degree of inclination in the yaw direction and the correction rate is illustrated as a graph in FIG. 12. For example, the correction rate for the right face line illustrated in FIG. 12 is set to decrease as the degree of inclination in the yaw direction decreases (that is, as the user is facing the right side more). On the other hand, the correction rate for the left face line illustrated in FIG. 12 is set to decrease as the degree of inclination in the yaw direction increases (that is, as the user is facing the left side more). As described above, after the correction rate is specified on the basis of the set correspondence relation, the revised alpha value can be calculated by using the following <yaw direction correction degree correction formula>.

Revised alpha value=α×correction rate/100 <Yaw direction correction degree correction formula>

As the distortion correction is performed on the original image on the basis of the revised alpha value as described above, it is possible to realize the correction of balancing the right and left faces of the user. For example, the user is facing the left side in the original image 41 of FIG. 12. In this case, "for right face line (before correction) T2a" is revised so that the correction degree is increased as in "for right face line (after correction) T2b" by the correction of the alpha value described above. Also, "for left face line (before correction) T3a" is revised so that the correction degree is increased as in "for left face line (after correction) T3b" by the correction of the alpha value described above. Accordingly, the right face line of the user which is the front side in the image undergoes the distortion correction more than the left face line, and thus the right face line of the user becomes slimmer. Therefore, the right and left faces of the user are balanced.

An example of a case in which the distortion correction is performed after the alpha value is revised on the basis of the yaw direction correction degree as described above will be described with reference to FIG. 13. FIG. 13 is a schematic diagram illustrating an example of an image which has undergone the distortion correction after the alpha value is revised in the slim face correction process. As illustrated in (B) in FIG. 13, when the distortion correction is performed without revising the alpha value, the right and left face lines of the face are corrected equally although the face is facing the right side, similarly to a case in which the face is facing the front side. Therefore, an image in which the left face line is emphasized is obtained. On the other hand, as illustrated in (A) in FIG. 13, when the distortion correction is performed after the alpha value is revised on the basis of the yaw direction correction degree as described above, the correction of the right face line is suppressed, and the left face line is more corrected, and thus the right face line of the user becomes slimmer. Therefore, the right and left faces of the user are balanced.

As described above, in the present modified example, for example, the degree of inclination is calculated from the depth information, and the template is revised without performing the complicated image analysis of detecting the contour or the like of the face line of the user, and thus it is possible to perform the corrections of balancing the face of the user. In other words, even in the present modified example, the correction process can be realized in a simpler method than in the related art.

Next, the revision of the alpha value in a case in which the face rotates upward or downward around the horizontal axis of the face (that is, pitching) which is performed similarly to the revision of the alpha value in a case in which the face rotates leftward or rightward around the vertical axis of the face (that is, yawing) will be described as an example. In this case, the depth information is acquired along with the detection of the face or the like by image analysis. Then, the degree of inclination (hereinafter referred to as "pitch direction degree of inclination") in the pitching 45 in which the face rotates upwards and downward around the horizontal axis direction 44 of the face illustrated in FIG. 12 is specified on the basis of the depth information. The specifying of the degree of inclination can be calculated on the basis of the difference in the depth information between two predetermined regions of the face, similarly to the above-described yaw direction degree of inclination. The predetermined regions are not particularly limited as long as they are regions in which the pitch direction degree of inclination can be calculated. In the following description, as an example, the pitch direction degree of inclination is calculated using the following <pitch direction degree of inclination calculation formula> on the basis of the depth information (depth value) between the eyebrows and the depth information (depth value) of the upper lip.

$$pitch = u\_c - d\_c, \text{<Pitch direction degree of inclination calculation formula>}$$

where u_c: the depth value between the eyebrows
d_c: the depth value of the upper lip
pitch: the degree of inclination in the pitch direction Then, the alpha value of the template corresponding to each predetermined region of the face is revised on the basis of this degree of inclination in the pitch direction. For example, the alpha value of the template corresponding to the chin of the user or the alpha value of the template corresponding to the forehead of the user is revised. The purpose of this correction is to make the face of the user balanced when the distortion correction is performed at the latter stage, similarly to the above-described yaw direction degree of inclination.

For example, when it can be specified that the user is facing upward on the basis of the degree of inclination in the pitch direction, the distortion correction degree (that is, the alpha value) of the template corresponding to the chin of the user is increased. Accordingly, the distortion correction is performed to make the chin thinner when the chin is out, so that the face of the user is balanced. On the other hand, if it can be determined that the user is facing downward, the distortion correction degree of the template corresponding to the user's chin is lowered. Accordingly, the distortion correction is performed so that the chin remains when tucking the chin in, and in this case, the face of the user is balanced.

In this regard, in the present modified example, the alpha value is revised so that the distortion correction is performed as described above. Therefore, similarly to the above-described yaw direction degree of inclination, a correspondence relation between the degree of inclination in the pitch direction and the correction rate is set in advance for each template. For example, the correction rate of the template of the chin is set to decrease as the pitch direction degree of inclination decreases (that is, as the user is facing downward more). On the other hand, the correction rate of the template of the chin is set to increase as the pitch direction degree of inclination increases (that is, as the user is facing upward more). As described above, the revised alpha value can be calculated by using the following <pitch direction correction degree correction formula> after the correction rate is specified on the basis of the set correspondence relation.

$$\text{Revised alpha value} = \alpha \times \text{correction rate}/100 \text{ <Pitch direction correction degree correction formula>}$$

As described above, even when the alpha value is revised on the basis of the pitch direction correction degree, the correction of balancing the face of the user can be realized, similarly to a case in which the alpha value is revised on the basis of the yaw direction degree of inclination described above.

An example in which the distortion correction is performed after the alpha value is revised on the basis of the pitch direction correction degree as described above will be described with reference to FIGS. 14 and 15. FIGS. 14 and 15 are both schematic diagrams illustrating another example of the image which has undergone the distortion correction after the alpha value is revised in the slim face correction process.

As illustrated in (B) in FIG. 14, when the distortion correction is performed without revising the alpha value, the chin is corrected regardless of whether or not the face is facing downward and the area of the chin is relatively small in the entire face, similarly to a case in which the face is facing the front side. Therefore, an image in which no chin remains is obtained. On the other hand, as illustrated in (A) in FIG. 14, when the distortion correction is performed after the alpha value is revised on the basis of the pitch direction correction degree as described above, the correction of the chin is suppressed, and thus the balance between the entire face and the chin is made.

Also, as illustrated in (B) in FIG. 15, when the distortion correction is performed without revising the alpha value, the chin is corrected regardless of whether or not the face is facing upward and the area of the chin is relatively large in the entire face, similarly to a case in which the face is facing the front side. Therefore, an image in which the chin stands out is obtained. On the other hand, as illustrated in (A) in FIG. 15, when the distortion correction is performed after the alpha value is revised on the basis of the pitch direction correction degree as described above, the chin is corrected more, and thus the balance between the entire face and the chin is made.

The revision of the alpha value in the present modified example has been described above. In the present modified example, either or both of the revision of the alpha value based on the pitch direction correction degree and the revision of the alpha value based on the yaw direction degree of inclination may be performed for one template. Also, the revision of the alpha value based on the correction degrees in different directions may be performed for each template.

<Operation of Modified Example 4>

Figure 16:
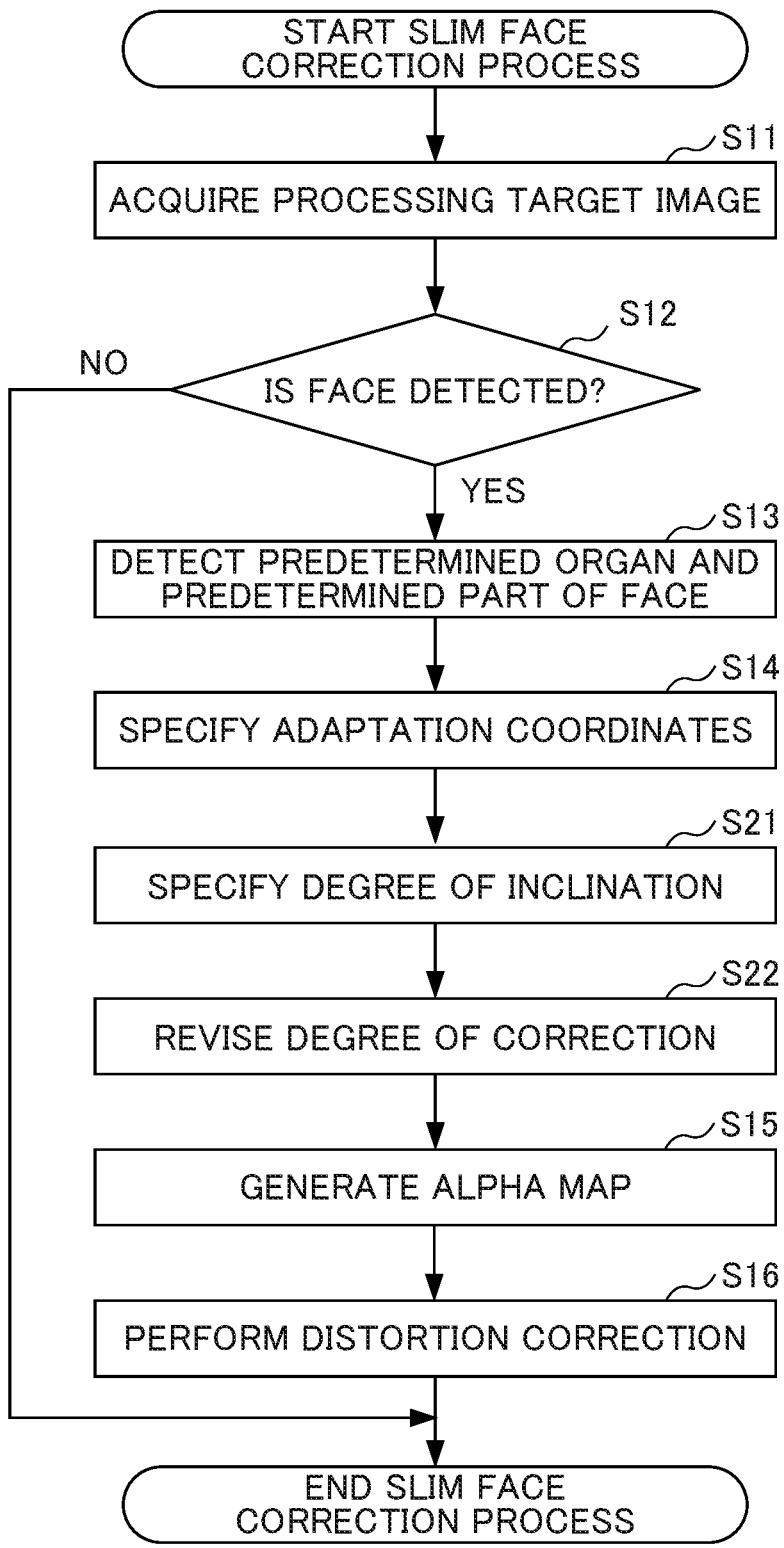
FIG. 16 is a flowchart for describing the flow of a slim face correction process in a fourth modified example executed by the imaging apparatus of FIG. 1 having the functional configuration of FIG. 3.

FIG. 16 is a flowchart for describing the flow of the slim face correction process in the present modified example which is executed by the imaging apparatus 1 of FIG. 1 having the functional configuration of FIG. 3. Functional blocks in the present modified example are basically the same as the functional blocks described above with reference to FIG. 3. However, a function for performing the following operation is further installed.

In step S11, the image acquisition unit 51 acquires data of the captured image obtained by performing the development process on the image captured by the imaging unit 16 or an image to be processed from the image storage unit 61. At this time, in the present modified example, the image acquisition unit 51 acquires the depth information corresponding to the original image along with the original image.

In step S12, the face detection unit 52 performs the face detection on the image to be processed and determines whether or not the face is detected. When the face is not detected, NO is determined in step S12, and the slim face correction process ends. If the face is detected, YES is determined in step S12, and the process proceeds to step S13.

In step S13, the face detection unit 52 detects a predetermined organ and a predetermined part of the face corresponding to the template. At this time, in the present modified example, the face detection unit 52 also detection of the depth information of the detected predetermined organ or the predetermined part (for example, below the left cheek, below the right cheek, between the eyebrows, and the upper lip).

In step S14, the adaptive position specifying unit 53 specifies coordinates in the original image adapting to the template.

In step S21, the adaptive position specifying unit 53 specifies the degree of inclination on the basis of the depth information of the predetermined organ or the predetermined part detected by the face detection unit 52 as in <Revision of alpha value> described above.

In step S22, the adaptive position specifying unit 53 revises the alpha value of each template on the basis of the degree of inclination specified in step S21 as in <Revision of alpha value> described above.

In step S15, the alpha map generating unit 54 generates the alpha map on the basis of the revised alpha value in step S22 and the coordinates adapting to the template.

In step S16, the distortion correction processing unit 55 performs the distortion correction to which the alpha map is applied. Thereafter, the slim face correction process ends.

With the above-described operation, the image in which the face of the user is balanced as described above with reference to FIGS. 13, 14 and 15 is generated. As described above, in the present modified example, for example, the degree of inclination is calculated from the depth information, and the template is revised without performing the complicated image analysis of detecting the contour or the like of the face line of the user, and thus it is possible to perform the corrections of balancing the face of the user. In other words, even in the present modified example, the correction process can be realized in a simpler method than in the related art.

Modified Examples

In the above-described embodiment, a digital camera has been described as an example of the imaging apparatus 1 to which the invention is applied. However, the invention is not particularly limited thereto. For example, the invention can be generally applied to electronic apparatuses with an image processing function. Specifically, for example, the invention can be applied to a notebook personal computer, a printer, a television receiver, a video camera, a portable navigation device, a mobile phone, a smart phone, and a portable game machine.

The processing sequence described above can be executed by hardware, and can also be executed by software. In other words, the hardware configuration of FIG. 3 is merely illustrative examples, and the present invention is not particularly limited thereto. More specifically, the types of functional blocks employed to realize the above-described functions are not particularly limited to the examples shown in FIG. 3, so long as the imaging apparatus 1 can be provided with the functions enabling the aforementioned processing sequence to be executed in its entirety. A single functional block may be constituted by a single piece of hardware, a single installation of software, or a combination thereof. The functional configurations of the present embodiment are realized by a processor executing arithmetic processing, and processors that can be used for the present embodiment include a unit configured by a single unit of a variety of single processing devices such as a single processor, multi-processor, multi-core processor, etc., and a unit in which the variety of processing devices are combined with a processing circuit such as ASIC (Application Specific Integrated Circuit) or FPGA (Field-Programmable Gate Array).

In the case of having the series of processing executed by software, the program constituting this software is installed from a network or storage medium to a computer or the like. The computer may be a computer equipped with dedicated hardware. In addition, the computer may be a computer capable of executing various functions, e.g., a general purpose personal computer, by installing various programs.

The storage medium containing such a program can not only be constituted by the removable medium 31 of FIG. 1 distributed separately from the device main body for supplying the program to a user, but also can be constituted by a storage medium or the like supplied to the user in a state incorporated in the device main body in advance. The removable medium 31 is composed of, for example, a magnetic disk (including a floppy disk), an optical disk, a magnetic optical disk, or the like. The optical disk is composed of, for example, a CD-ROM (Compact Disk-Read Only Memory), a DVD (Digital Versatile Disk), Blu-ray (Registered Trademark) or the like. The magnetic optical disk is composed of an MD (Mini-Disk) or the like. The storage medium supplied to the user in a state incorporated in the device main body in advance is constituted by, for example, the ROM 12 of FIG. 1 in which the program is recorded, and a hard disk included in the storage unit 19 of FIG. 1, and the like.

It should be noted that, in the present specification, the steps defining the program recorded in the storage medium include not only the processing executed in a time series following this order, but also processing executed in parallel or individually, which is not necessarily executed in a time series.

The embodiments of the present invention described above are only illustrative, and are not to limit the technical scope of the present invention. The present invention can assume various other embodiments. Additionally, it is possible to make various modifications thereto such as omissions or replacements within a scope not departing from the spirit of the present invention. These embodiments or modifications thereof are within the scope and the spirit of the invention described in the present specification, and within the scope of the invention recited in the claims and equivalents thereof.

What is claimed is:

1. An image processing device comprising:
   a processor,
   wherein the processor is configured to perform operations comprising:
   acquiring an image including a subject;
   specifying coordinates corresponding to a correction target region in the image adapting to a template, wherein the template is one of a plurality of templates that are stored in a memory and correspond to a plurality of different correction target regions, and wherein the template includes a plurality of correction degrees that are different from each other and that are associated with different positions in the template; and
   performing correction on the correction target region of the image based on (i) the coordinates specified by the specifying and (ii) the plurality of correction degrees included in the template,
   wherein each correction degree of the plurality of correction degrees indicates a degree to which image data is to be corrected at a position in the correction target region corresponding to a position in the template with which the correction degree is associated, and
   wherein the specifying comprises:
   analyzing the image and detecting coordinates corresponding to a first feature point of the subject and coordinates corresponding to a second feature point of the subject, and
   specifying coordinates adapting to a base point in the template based on the detected coordinates of the first feature point, and specifying coordinates adapting to a contour in the template based on the detected coordinates of the second feature point.

2. The image processing device according to claim 1, wherein the specifying comprises specifying the coordinates adapting to the template by arranging the base point of the template at the coordinates of the first feature point and rotating the template using the arranged base point of the template as a rotation center.

3. The image processing device according to claim 1, wherein the specifying comprises performing enlargement or reduction while maintaining a shape of the contour of the template based on the detected coordinates of the second feature point and the contour in the template.

4. The image processing device according to claim 3, wherein the specifying comprises not changing the plurality of correction degrees included in the template.

5. The image processing device according to claim 1, wherein the specifying comprises specifying a state of the subject in the image and revising the plurality of correction degrees included in the template based on the specified state of the subject, and
   wherein the performing the correction comprises correcting the correction target region of the image based on (i) the plurality of correction degrees revised in the specifying and (ii) the specified coordinates.

6. The image processing device according to claim 5, wherein the specifying comprises specifying a degree of an inclination of the subject in the image as the state of the subject based on a difference between a depth of a first region of the subject in the image and a depth of a second region of the subject in the image.

7. The image processing device according to claim 5, wherein the performing the correction comprises performing at least a distortion correction by moving coordinates of the image with correction degrees corresponding to the plurality of correction degrees included in the template as the correction for the image.

8. The image processing device according to claim 5, wherein the specifying comprises specifying coordinates adapting to the plurality of the templates independently for each of the plurality of templates.

9. The image processing device according to claim 1, wherein the performing the correction comprises performing at least a distortion correction by moving coordinates of the image with correction degrees corresponding to the plurality of correction degrees included in the template as the correction for the image.

10. The image processing device according to claim 1, wherein the specifying comprises specifying coordinates adapting to the plurality of the templates independently for each of the plurality of templates.

11. The image processing device according to claim 10, wherein the template has a shape corresponding to a shape of a part of a face of the subject or an organ of the face of the subject.

12. The image processing device according to claim 1, wherein the subject comprises a face, and
    wherein the correction target region comprises an organ of the face or a part of the face.

13. The image processing device according to claim 1, wherein the plurality of correction degrees are set in the template so that a portion around a contour of the template has a smaller correction degree than a central portion of the template.

14. The image processing device according to claim 1, wherein the template has a shape corresponding to the correction target region of the subject in the image, and a plurality of correction degrees set in the shape are different.

15. The image processing device according to claim 1, wherein the template includes correction degrees of respective positions in a shape corresponding to the correction target region of the subject in the image, the correction degrees being different at the respective positions.

16. An image processing method executed by a computer including a processor, the method comprising:
    acquiring an image including a subject;
    specifying coordinates corresponding to a correction target region in the image adapting to a template, wherein the template is one of a plurality of templates that are stored in a memory and correspond to a plurality of different correction target regions, and wherein the template includes a plurality of correction degrees that are different from each other and that are associated with different positions in the template; and
    performing correction on the correction target region of the image based on (i) the coordinates specified by the specifying and (ii) the plurality of correction degrees included in the template,
    wherein each correction degree of the plurality of correction degrees indicates a degree to which image data is to be corrected at a position in the correction target region corresponding to a position in the template with which the correction degree is associated, and
    wherein the specifying comprises:
    analyzing the image and detecting coordinates corresponding to a first feature point of the subject and coordinates corresponding to a second feature point of the subject, and
    specifying coordinates adapting to a base point in the template based on the detected coordinates of the first feature point, and specifying coordinates adapting to a contour in the template based on the detected coordinates of the second feature point.

17. A non-transitory computer-readable storage medium storing a program thereon, the program being executable to cause a computer to execute processes comprising:
acquiring an image including a subject;
specifying coordinates corresponding to a correction target region in the image adapting to a template, wherein the template is one of a plurality of templates that are stored in a memory and correspond to a plurality of different correction target regions, and wherein the template includes a plurality of correction degrees that are different from each other and that are associated with different positions in the template; and
performing correction on the correction target region of the image based on (i) the coordinates specified by the specifying and (ii) the plurality of correction degrees included in the template,
wherein each correction degree of the plurality of correction degrees indicates a degree to which image data is to be corrected at a position in the correction target region corresponding to a position in the template with which the correction degree is associated, and wherein the specifying comprises:

analyzing the image and detecting coordinates corresponding to a first feature point of the subject and coordinates corresponding to a second feature point of the subject, and specifying coordinates adapting to a base point in the template based on the detected coordinates of the first feature point, and specifying coordinates adapting to a contour in the template based on the detected coordinates of the second feature point.

* * * * *